(12) United States Patent
Wang et al.

(10) Patent No.: US 12,518,834 B2
(45) Date of Patent: Jan. 6, 2026

(54) ADAPTIVE ERASE PULSE TO IMPROVE MEMORY CELL ENDURANCE AND ERASE TIME IN NON-VOLATILE MEMORY

(71) Applicant: Sandisk Technologies, Inc., Milpitas, CA (US)

(72) Inventors: Ming Wang, Shanghai (CN); Liang Li, Shanghai (CN); Yichen Wang, Shanghai (CN)

(73) Assignee: Sandisk Technologies, Inc., Milpitas, CA (US)

( * ) Notice: Subject to any disclaimer, the term of this patent is extended or adjusted under 35 U.S.C. 154(b) by 319 days.

(21) Appl. No.: 18/360,992

(22) Filed: Jul. 28, 2023

(65) Prior Publication Data

US 2025/0037772 A1    Jan. 30, 2025

(51) Int. Cl.
| | |
|---|---|
| *G11C 16/16* | (2006.01) |
| *G11C 16/04* | (2006.01) |
| *G11C 16/34* | (2006.01) |
| *H01L 25/065* | (2023.01) |
| *H10B 43/27* | (2023.01) |
| *H10B 43/35* | (2023.01) |

(52) U.S. Cl.
CPC ......... *G11C 16/16* (2013.01); *G11C 16/0483* (2013.01); *G11C 16/3445* (2013.01); *H10B 43/27* (2023.02); *H10B 43/35* (2023.02); *H01L 25/0657* (2013.01); *H01L 2225/06562* (2013.01)

(58) Field of Classification Search
CPC . G11C 16/16; G11C 16/0483; G11C 16/3445; H10B 43/35; H10B 43/27; H01L 25/0657; H01L 2225/06562

USPC ..................................................... 365/185.17
See application file for complete search history.

(56) References Cited

U.S. PATENT DOCUMENTS

| | | |
|---|---|---|
| 11,120,880 B1 | 9/2021 | Wang et al. |
| 11,309,041 B2 | 4/2022 | Li et al. |
| 11,335,411 B1 | 5/2022 | Lien et al. |
| 11,335,419 B1 | 5/2022 | Li et al. |
| 11,557,346 B2 | 1/2023 | Li et al. |
| 2015/0117112 A1* | 4/2015 | He ................ G11C 16/14 365/185.19 |
| 2016/0188231 A1* | 6/2016 | Mittelholzer ...... G06F 3/0688 714/704 |
| 2019/0272882 A1* | 9/2019 | Guy ............... G11C 11/5678 |
| 2020/0211652 A1* | 7/2020 | Wu .................... G11C 7/04 |
| 2023/0402103 A1* | 12/2023 | Lai ................ G11C 16/3477 |

* cited by examiner

*Primary Examiner* — Amir Zarabian
*Assistant Examiner* — Daniel John King
(74) *Attorney, Agent, or Firm* — Pearl Cohen Zedek Latzer Baratz LLP

(57) ABSTRACT

To improve memory cell endurance and erase times for non-volatile memories, such as NAND memory, a sub-block based adaptive erase pulse is used. In a memory structure where the array is composed of blocks that have multiple sub-blocks, after applying an erase pulse to an erase selected block, one of the sub-blocks is erased verified and, if it fails to verify, the next erase pulse's duration is tuned based on the number of memory cells of that sub-block that fail to verify. If the first verified one of the sub-blocks verifies, the other sub-blocks of the erase selected block are erased verified, with the next erase pulse's duration tuned based on the number of the other sub-blocks that fail to verify.

20 Claims, 26 Drawing Sheets

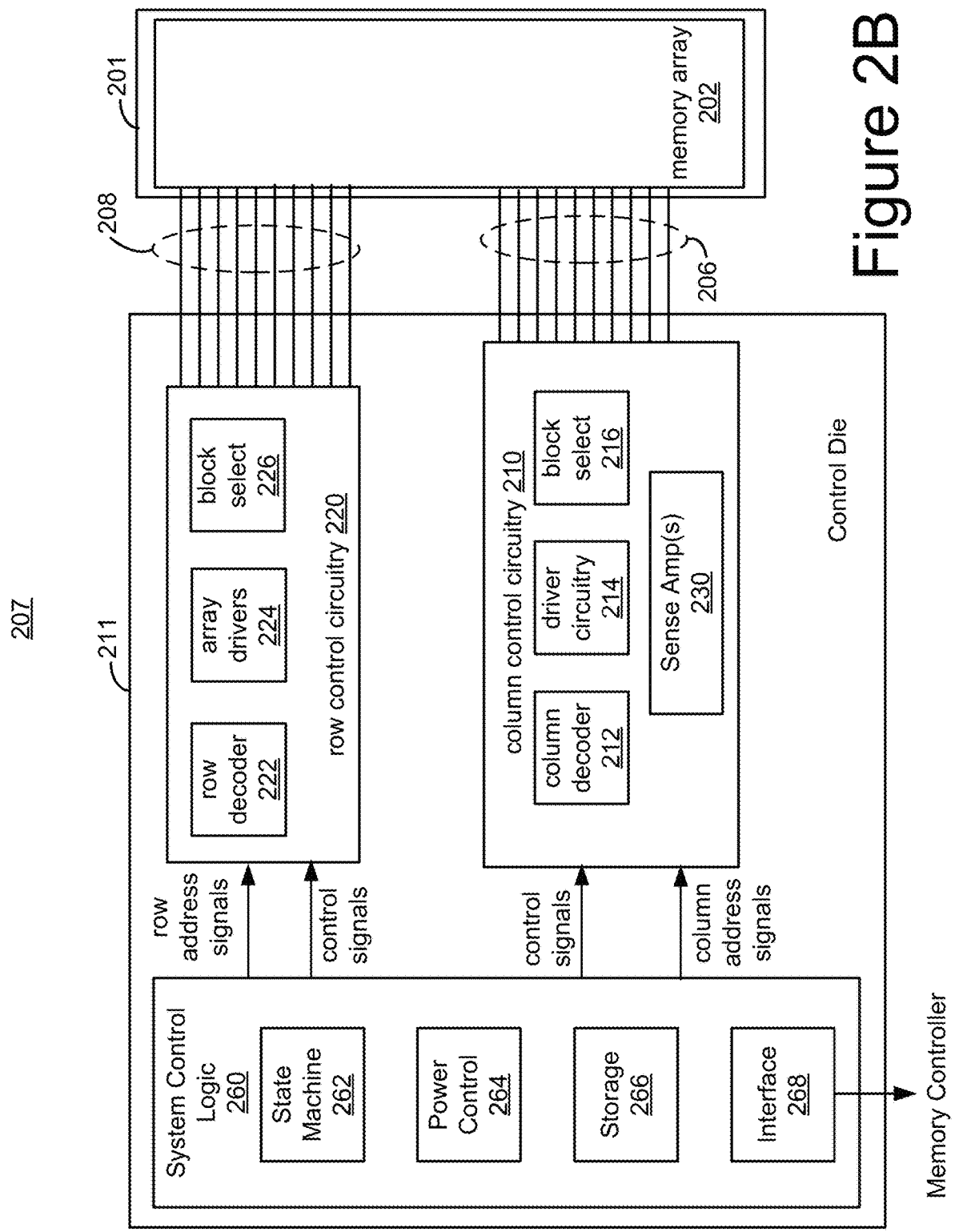

Table A: SB0 verify fail

| N is cell # with Vt > Vera level | Distance between current Vth and target Vth | Next pulse width tunning |
|---|---|---|
| N1 ≤ N | L1 | PW_STD-DPW1 |
| N2 ≤ N < N1 | L2 | PW_STD-DPW2 |
| 0 ≤ N < N2 | L3 | PW_STD-DPW3 |

Figure 15

Table B: SB0 verify pass, other sub-block verify fail

| M is SB# that have not pass verified | Distance between current Vth and target Vth | Next pulse width tunning |
|---|---|---|
| M = 3 (SB1 fail) | L4 | PW_STD-DPW4 |
| M = 2 (SB1 pass and SB2 fail) | L5 | PW_STD-DPW5 |
| M = 1 (SB1/SB2 pass, SB3 fail) | L6 | PW_STD-DPW6 |

Figure 17

ADAPTIVE ERASE PULSE TO IMPROVE
MEMORY CELL ENDURANCE AND ERASE
TIME IN NON-VOLATILE MEMORY

BACKGROUND

The present disclosure relates to non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery). One example of non-volatile memory is flash memory (e.g., NAND-type and NOR-type flash memory).

Users of non-volatile memory can program (e.g., write) data to the non-volatile memory and later read that data back. For example, a digital camera may take a photograph and store the photograph in non-volatile memory. Later, a user of the digital camera may view the photograph by having the digital camera read the photograph from the non-volatile memory.

BRIEF DESCRIPTION OF THE DRAWINGS

Like-numbered elements refer to common components in the different figures.

FIG. 2B is a block diagram of one embodiment of an integrated memory assembly.

FIG. 15 is a table for an embodiment to determine the next erase pulse tuning based resultant distribution of memory cell Vth values after the preceding erase pulse.

FIG. 17 is a table for an embodiment to determine the next erase pulse tuning based on the verify results of sub-blocks after the preceding erase pulse.

DETAILED DESCRIPTION

The erase process for non-volatile memory devices, such as NAND memory, is a relatively time consuming operation, which can hurt performance, and places the memory device under a high amount of strain, which can lead to device failure. To improve memory cell endurance and erase times for non-volatile memories, such as NAND memory, a sub-block based adaptive erase pulse is used. In a memory structure where the array is composed of blocks that have multiple sub-blocks, after applying an erase pulse to an erase selected block, one of the sub-blocks is erased verified and, if it fails to verify, the next erase pulse's duration is tuned based on the number of memory cells of that sub-block that fail to verify. If the first verified one of the sub-blocks verifies, the other sub-blocks of the erase selected block are erased verified, with the next erase pulse's duration tuned based on the number of the other sub-blocks that fail to verify.

Figure 1:
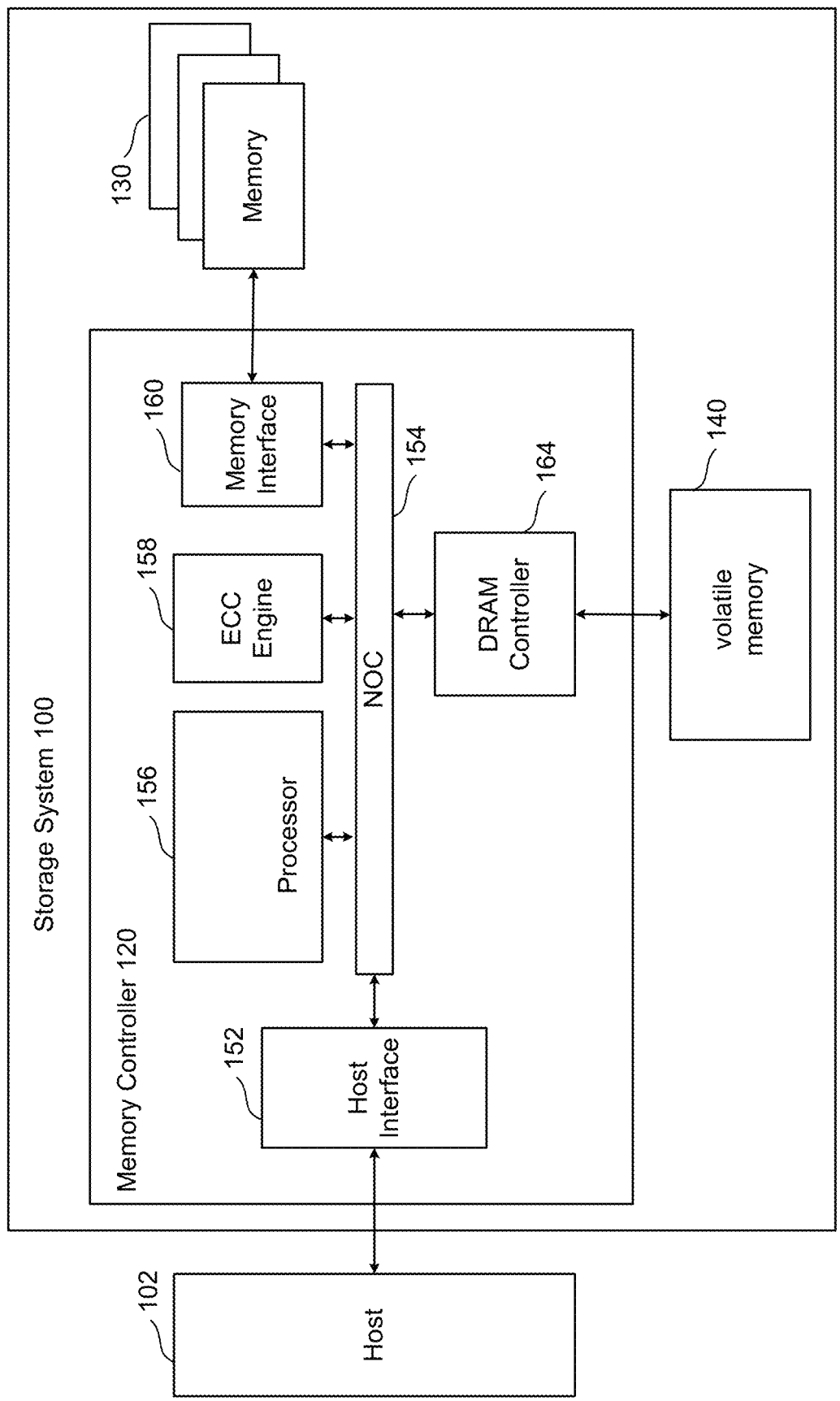
FIG. 1 is a block diagram depicting one embodiment of a storage system.

FIG. 1 is a block diagram of one embodiment of a storage system 100 that implements the proposed technology described herein. In one embodiment, storage system 100 is a solid state drive ("SSD"). Storage system 100 can also be a memory card, USB drive or other type of storage system. The proposed technology is not limited to any one type of memory system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 connected to non-volatile memory 130 and local high speed volatile memory 140 (e.g., DRAM). Local high speed volatile memory 140 is used by memory controller 120 to perform certain functions. For example, local high speed volatile memory 140 stores logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and DRAM controller 164. DRAM controller 164 is used to operate and communicate with local high speed volatile memory 140 (e.g., DRAM). In other embodiments, local high speed volatile memory 140 can be SRAM or another type of volatile memory.

ECC engine 158 performs error correction services. For example, ECC engine 158 performs data encoding and decoding, as per the implemented ECC technique. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory dies. One example implementation is to maintain tables (i.e., the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a memory die 130 and a subset of the L2P tables are cached (L2P cache) in the local high speed volatile memory 140.

Memory interface 160 communicates with non-volatile memory 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
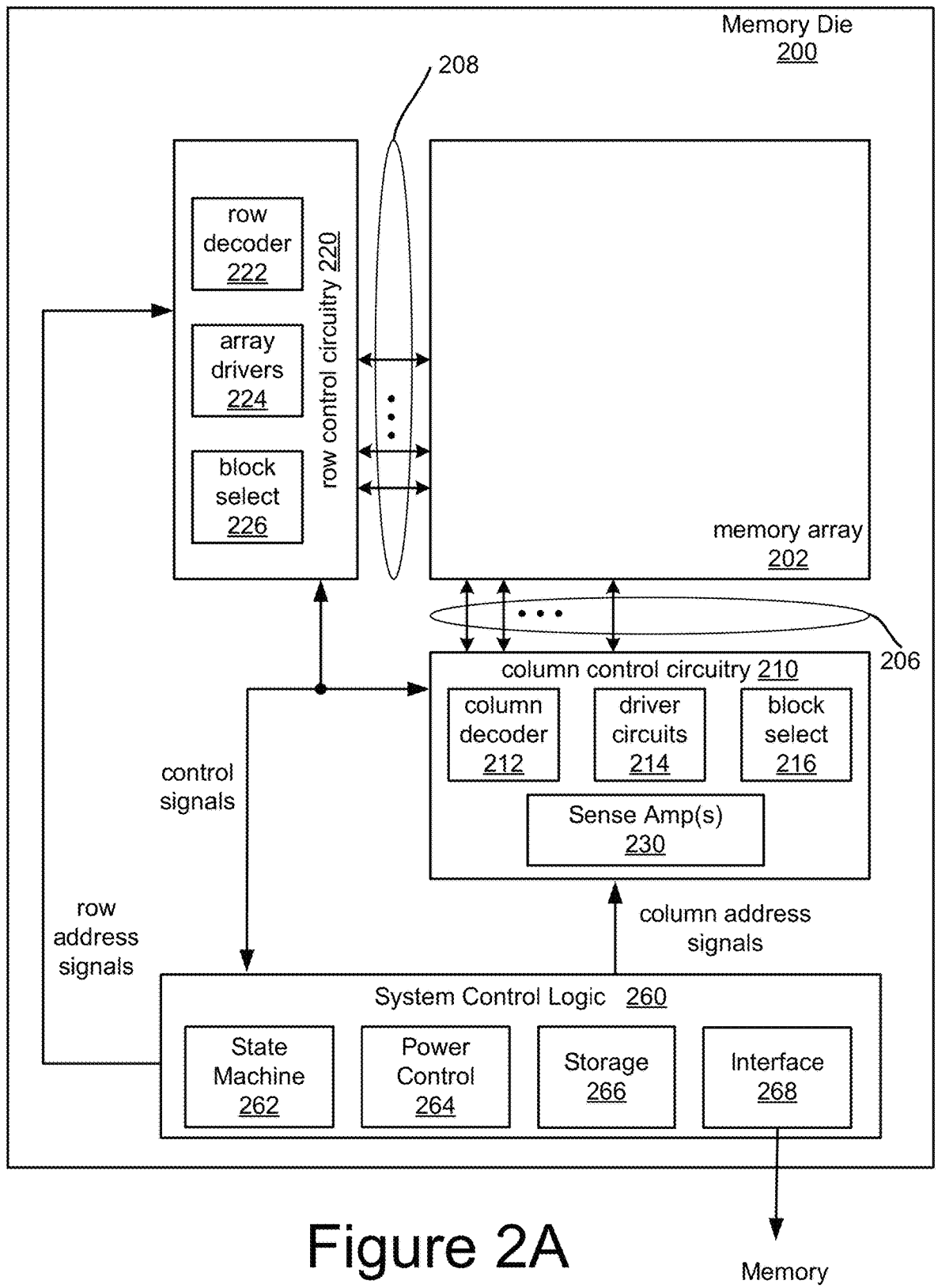
FIG. 2A is a block diagram of one embodiment of a memory die.

In one embodiment, non-volatile memory 130 comprises one or more memory die. FIG. 2A is a functional block diagram of one embodiment of a memory die 200 that comprises non-volatile memory 130. Each of the one or more memory die of non-volatile memory 130 can be implemented as memory die 200 of FIG. 2A. The components depicted in FIG. 2A are electrical circuits. Memory die 200 includes a memory array 202 that can comprises non-volatile memory cells, as described in more detail below. The array terminal lines of memory array 202 include the various layer(s) of word lines organized as rows, and the various layer(s) of bit lines organized as columns. However, other orientations can also be implemented. Memory die 200 includes row control circuitry 220, whose outputs 208 are connected to respective word lines of the memory array 202. Row control circuitry 220 receives a group of M row address signals and one or more various control signals from System Control Logic circuit 260, and typically may include such circuits as row decoders 222, array terminal drivers 224, and block select circuitry 226 for both reading and writing (programming) operations. Row control circuitry 220 may also include read/write circuitry. Memory die 200 also includes column control circuitry 210 including sense amplifier(s) 230 whose input/outputs 206 are connected to respective bit lines of the memory array 202. Although only single block is shown for array 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuitry 216, as well as read/write circuitry, and I/O multiplexers.

System control logic 260 receives data and commands from memory controller 120 and provides output data and status to the host. In some embodiments, the system control logic 260 (which comprises one or more electrical circuits) include state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 262 can also include a power control module 264 that controls the power and voltages supplied to the rows and columns of the memory structure 202 during memory operations and may include charge pumps and regulator circuit for creating regulating voltages. System control logic 262 includes storage 366 (e.g., RAM, registers, latches, etc.), which may be used to store parameters for operating the memory array 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 302 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or another wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more die, such as two memory die and one control die, for example.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile memory 130 of storage system 100. The integrated memory assembly 207 includes two types of semiconductor die (or more succinctly, "die"). Memory die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory die 201. In some embodiments, the memory die 201 and the control die 211 are bonded together.

FIG. 2B shows an example of the peripheral circuitry, including control circuits, formed in a peripheral circuit or control die 211 coupled to memory structure 202 formed in memory die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory die 201. In some embodiments, some of the circuitry in the system control logic 260 is located on the on the memory die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory 2 die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including sense amplifier(s) 230 on the control die 211 coupled to memory structure 202 on the memory die 201 through electrical paths 206. For example, electrical paths 206 may provide electrical connection between column decoder 212, driver circuitry 214, and block select 216 and bit lines of memory structure 202. Electrical paths may extend from column control circuitry 210 in control die 211 through pads on control die 211 that are bonded to corresponding pads of the memory die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory die 201.

For purposes of this document, the phrases "a control circuit" or "one or more control circuits" can include any one of or any combination of memory controller 120, state machine 262, all or a portion of system control logic 260, all or a portion of row control circuitry 220, all or a portion of column control circuitry 210, a microcontroller, a microprocessor, and/or other similar functioned circuits. The control circuit can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

Figure 3A:
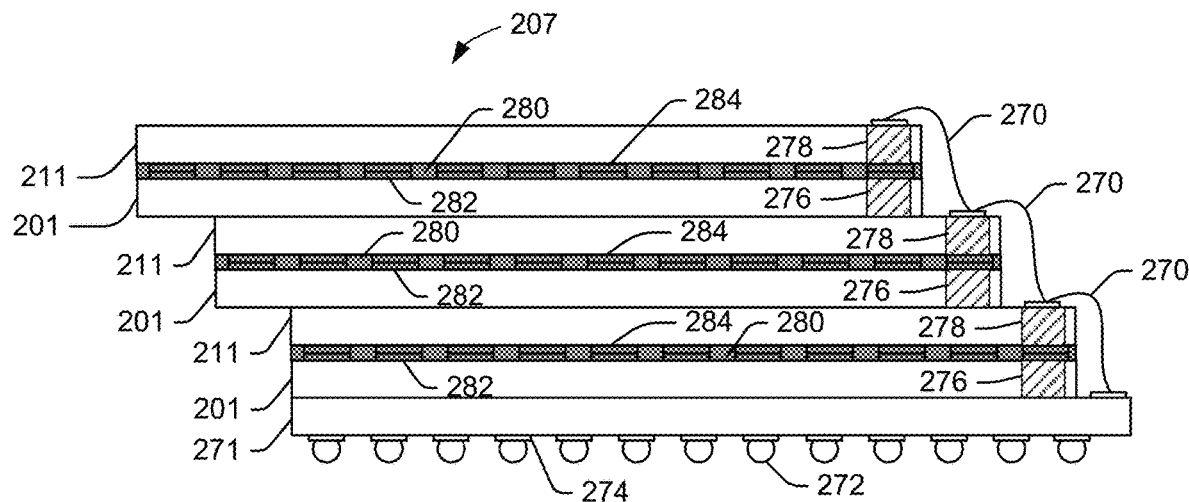
FIGS. 3A and 3B depict different embodiments of integrated memory assemblies.

In some embodiments, there is more than one control die 211 and more than one memory die 201 in an integrated memory assembly 207. In some embodiments, the integrated memory assembly 207 includes a stack of multiple control die 211 and multiple memory die 201. FIG. 3A depicts a side view of an embodiment of an integrated memory assembly 207 stacked on a substrate 271 (e.g., a stack comprising control dies 211 and memory dies 201). The integrated memory assembly 207 has three control dies 211 and three memory dies 201. In some embodiments, there are more than three memory dies 201 and more than three control die 211.

Each control die 211 is affixed (e.g., bonded) to at least one of the memory dies 201. Some of the bond pads 282/284 are depicted. There may be many more bond pads. A space between two dies 201, 211 that are bonded together is filled with a solid layer 280, which may be formed from epoxy or other resin or polymer. This solid layer 280 protects the electrical connections between the dies 201, 211, and further secures the dies together. Various materials may be used as solid layer 280, but in embodiments, it may be Hysol epoxy resin from Henkel Corp., having offices in California, USA.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 3B:
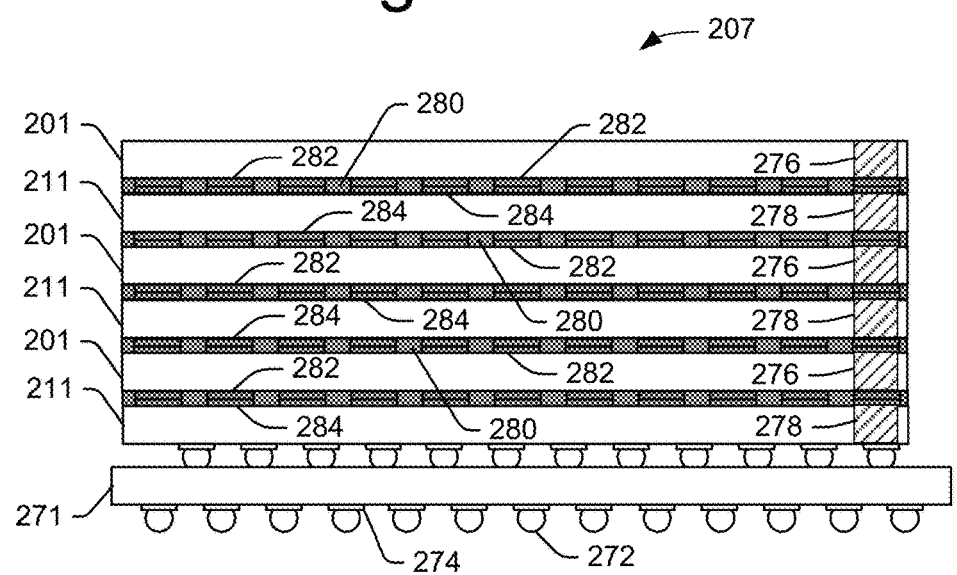

FIG. 3B depicts a side view of another embodiment of an integrated memory assembly 207 stacked on a substrate 271. The integrated memory assembly 207 of FIG. 3B has three control die 211 and three memory die 201. In some embodiments, there are many more than three memory dies 201 and many more than three control dies 211. In this example, each control die 211 is bonded to at least one memory die 201. Optionally, a control die 211 may be bonded to two or more memory die 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory die 201 may be bonded together. Bond pads on each die 201, 211 may be used to bond the two dies together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor dies including the bond pads. The film layer is provided around the bond pads. When the dies are brought together, the bond pads may bond to each other, and the film layers on the respective dies may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller (or greater) sizes and pitches.

Some embodiments may include a film on surface of the dies 201, 211. Where no such film is initially provided, a space between the dies may be under filled with an epoxy or other resin or polymer. The under-fill material may be applied as a liquid which then hardens into a solid layer. This under-fill step protects the electrical connections between the dies 201, 211, and further secures the dies together. Various materials may be used as under-fill material, but in embodiments, it may be Hysol epoxy resin from Henkel Corp., having offices in California, USA.

Figure 4:
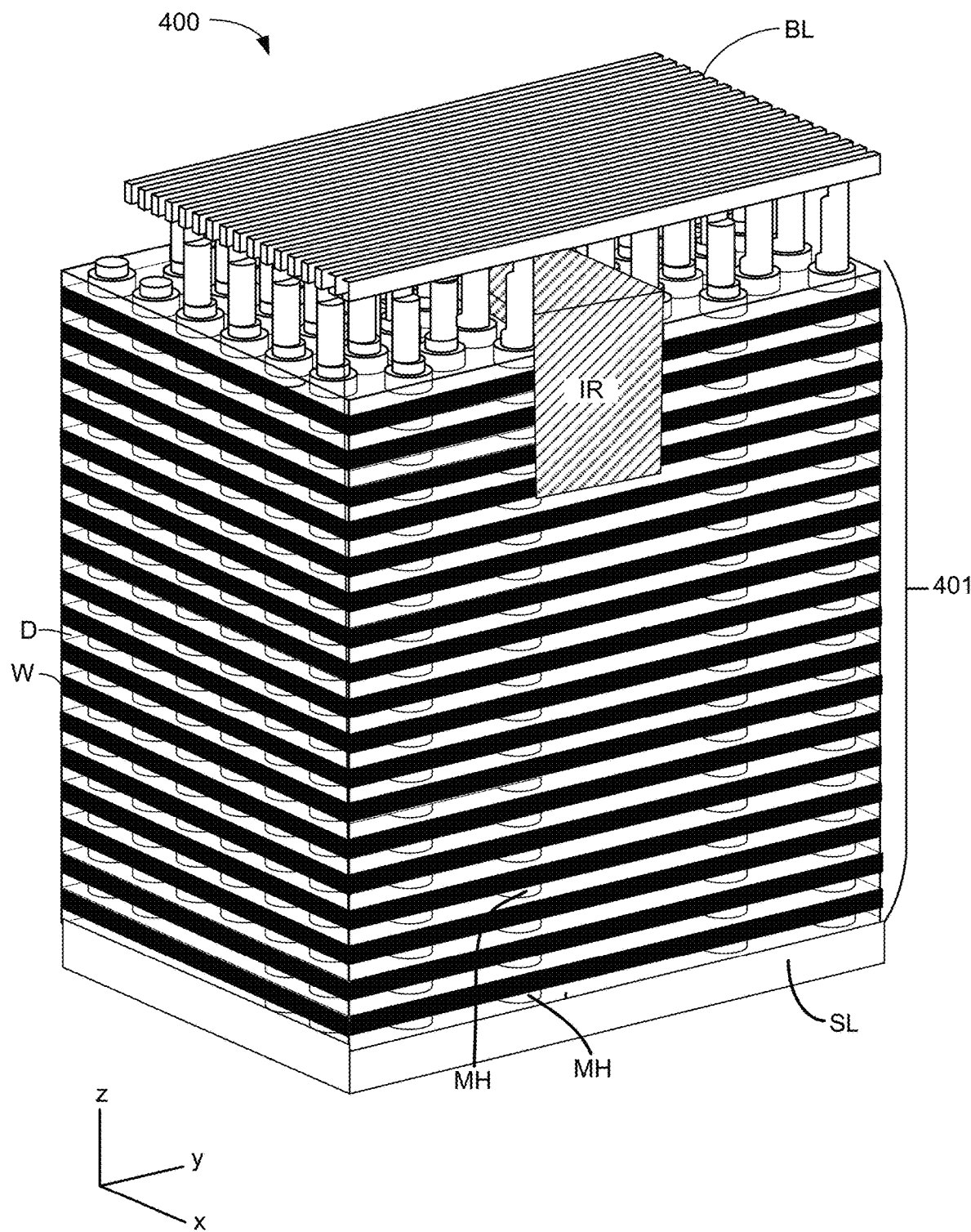
FIG. 4 is a perspective view of a portion of one embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. As will be explained below, in one embodiment the alternating dielectric layers and conductive layers are divided into sub-blocks by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. Thus, the non-volatile memory cells are arranged in memory holes. More details of the three dimensional monolithic memory array that comprises memory structure 202 is provided below.

Figure 4A:
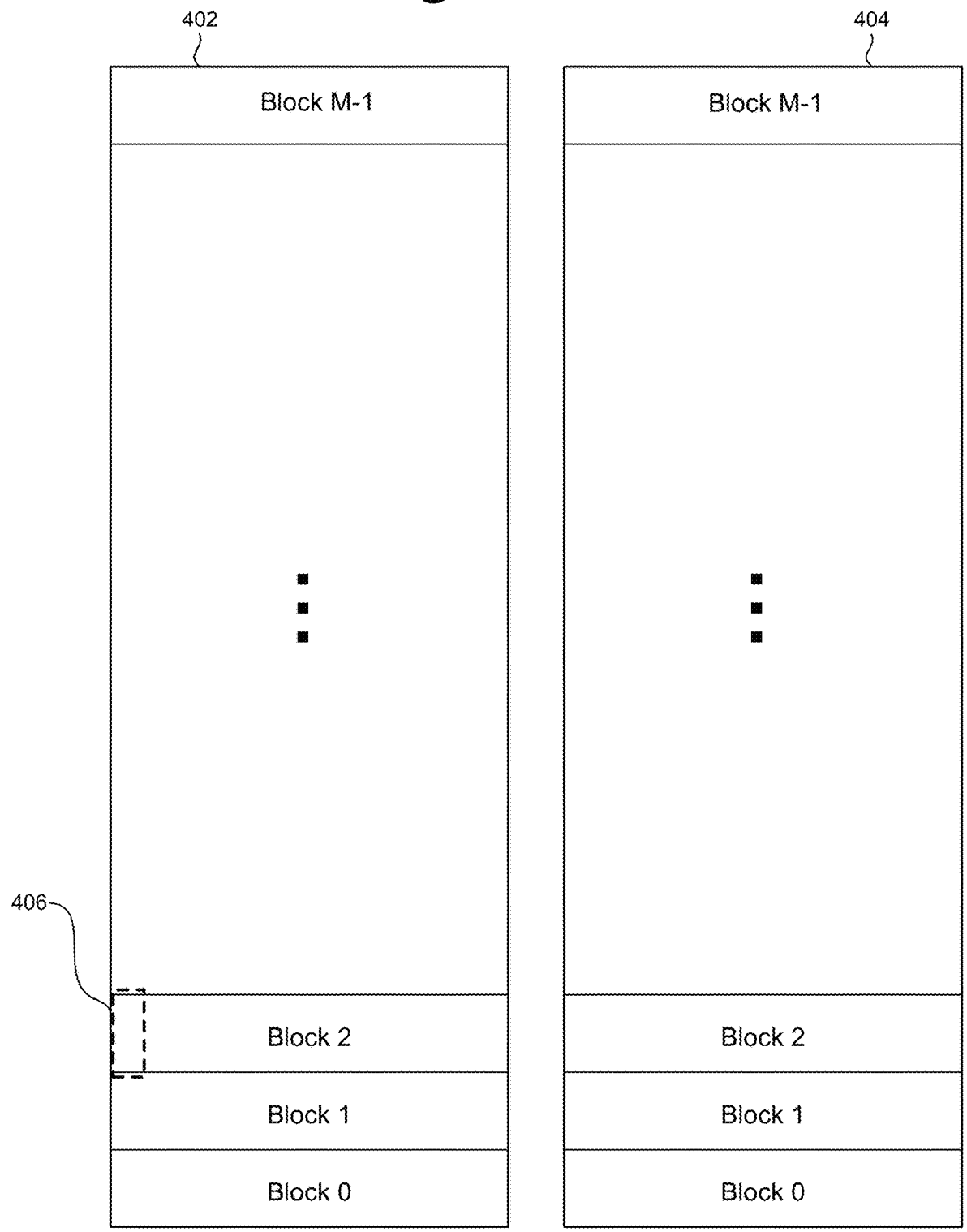
FIG. 4A is a block diagram of one embodiment of a memory structure having two planes.

FIG. 4A is a block diagram explaining one example organization of memory structure 202, which is divided into two planes 402 and 404. Each plane is then divided into M blocks. In one example, each plane has about 2000 blocks. However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In one embodiment, a block includes a group of memory cells (or group of NAND strings) connected to a common set of word lines, and different blocks are connected to different word lines. For example, the word lines for a block are all connected to all of the vertical NAND strings for that block. Although FIG. 4A shows two planes 402/404, more or less than two planes can be implemented. In some embodiments, memory structure 202 includes eight planes.

Figure 4B:
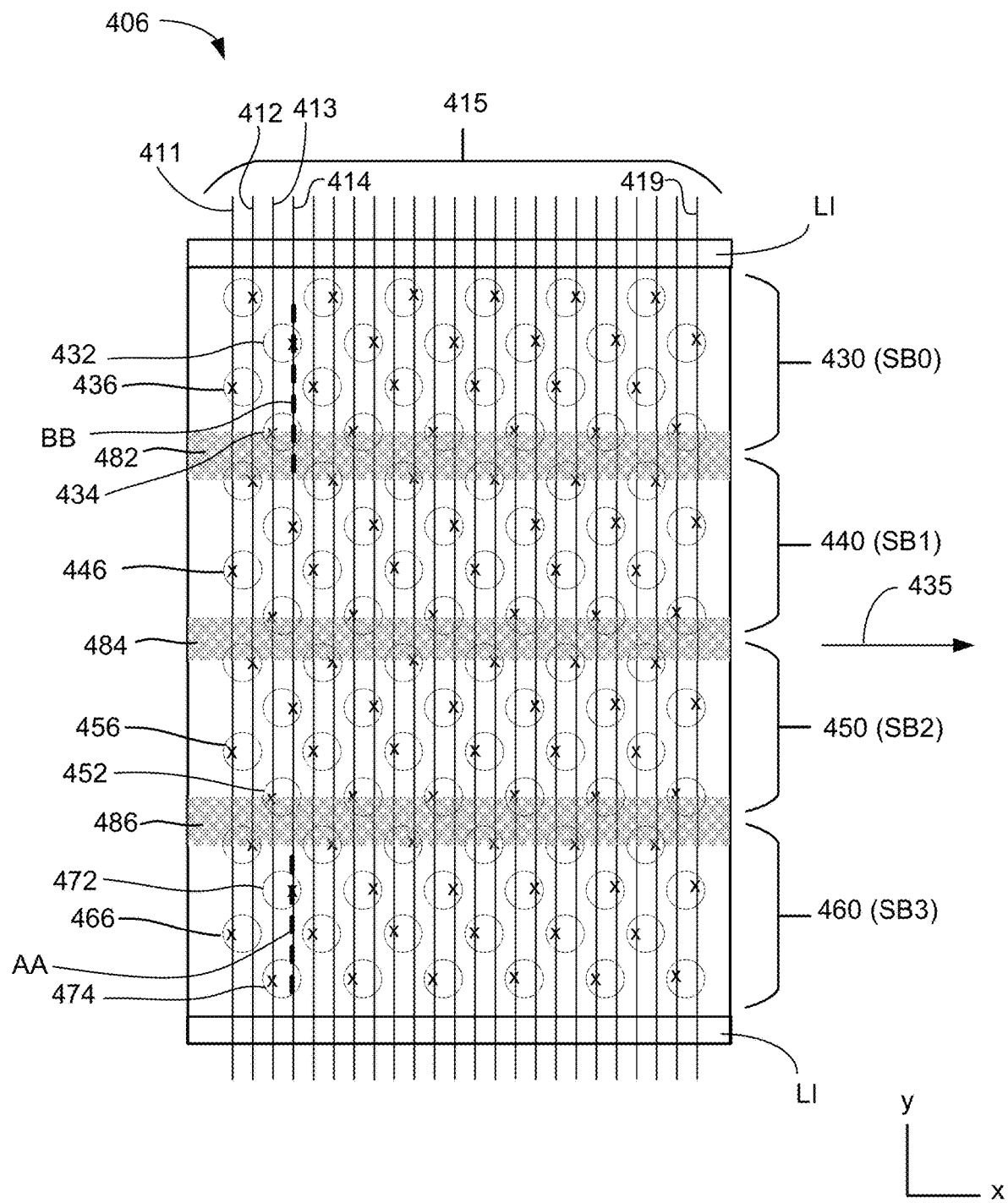
FIG. 4B depicts a top view of a portion of one embodiment of a block of memory cells.

FIGS. 4B-4H depict an example three dimensional ("3D") NAND structure that corresponds to the structure of FIG. 4 and can be used to implement memory structure 202 of FIGS. 2A and 2B. FIG. 4B is a block diagram depicting a top view of a portion 406 of Block 2 of plane 402. As can be seen from FIG. 4B, the block depicted in FIG. 4B extends in the direction of arrow 435. In one embodiment, the memory array has many layers; however, FIG. 4B only shows the top layer.

FIG. 4B depicts a plurality of circles that represent the memory holes, which are also referred to as vertical columns. Each of the memory holes/vertical columns include multiple GIDL generation transistors, multiple select transistors (also referred to as a select gates or selection gates) and multiple memory cells. In one embodiment, each memory hole/vertical column implements a NAND string. For example, FIG. 4B labels a subset of the memory holes/vertical columns/NAND strings 432, 436, 446, 456, 462, 466, 472, and 474.

FIG. 4B also depicts a set of bit lines 415, including bit lines 411, 412, 413, 414, . . . 419. FIG. 4B shows twenty four bit lines because only a portion of the block is depicted. It is contemplated that more than twenty four bit lines connected to memory holes/vertical columns of the block. Each of the circles representing memory holes/vertical columns has an "x" to indicate its connection to one bit line. For example, bit line 411 is connected to memory holes/vertical columns 436, 446, 456, and 466.

The block depicted in FIG. 4B includes a set of isolation regions 482, 484, and 486, which are formed of SiO$_2$; however, other dielectric materials can also be used. Isolation regions 482, 484, and 486 serve to divide the top layers of the block into regions so that the block is divided into sub-blocks; for example, the top layer depicted in FIG. 4B is divided into regions 430, 440, 450, and 460 corresponding to sub-blocks SB), SB1, SB2 and SB3. Region 430 corresponds to sub-block SB0. Region 440 corresponds to sub-block SB1. Region 450 corresponds to sub-block SB2. Region 460 corresponds to sub-block SB3. Each sub-block represents a subset or portion of the block. The technology proposed herein allows each sub-block to be independently programmed and erased, which allows memory operation and usage to be more efficient. Additionally, by allowing a sub-block to be erased without erasing the entire block, the memory cells endurance will be increased due to the reduced memory operations being performed on each memory cell. In one embodiment, the isolation regions only divide the layers used to implement GIDL generation transistors and select gates so that NAND strings in different regions can be independently selected. In one embodiment, there are isolation regions for the top layers (drain side GIDL generation transistors and select gates) and isolation regions for the bottom layers (source side GIDL generation transistors and select gates). In one example implementation, a bit line connects to one memory hole/vertical column/NAND string in each of regions 430, 440, 450, and 460. In one embodiment, all of the four memory holes/vertical columns/NAND strings connected to a common bit line are connected to the same set of word lines; therefore, the system uses the drain side selection lines and/or source side selection lines to choose one (or another subset) of the four to be subjected to a memory operation (program, verify, read, and/or erase).

FIG. 4B also shows Line Interconnects L1, which are metal connections to the source line SL from above the memory array. Line Interconnects L1 are positioned adjacent regions 430 and 470.

Although FIG. 4B shows each region/sub-block 430 (SB0), 440 (SB1), 450 (SB2), and 460 (SB3) having four rows of memory holes/vertical columns, five regions and twenty four rows of memory holes/vertical columns in a block, those exact numbers are an example implementation. Other embodiments may include more or less regions per block, more or less rows of memory holes/vertical columns per region and more or less rows of vertical columns per block. FIG. 4B also shows the memory holes/vertical columns being staggered. In other embodiments, different patterns of staggering can be used. In some embodiments, the memory holes/vertical columns are not staggered.

Figure 4C:
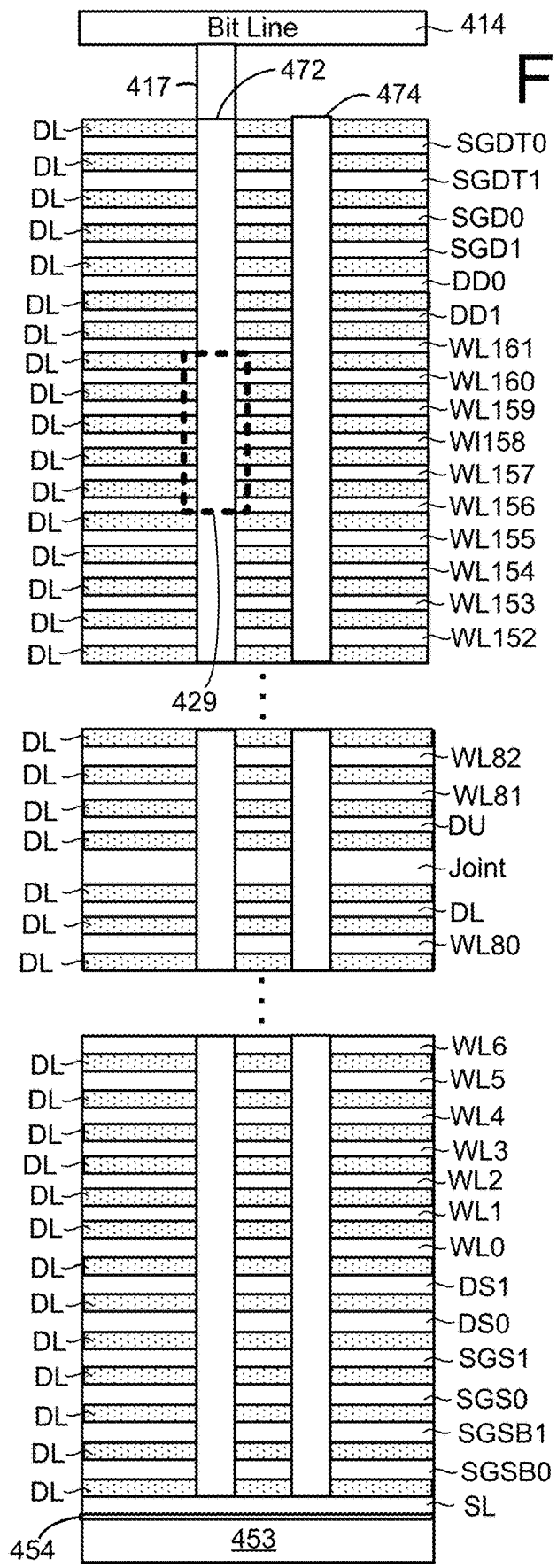
FIG. 4C depicts a cross sectional view of a portion of one embodiment of a block of memory cells.

FIG. 4C depicts a portion of one embodiment of a three dimensional memory structure 202 showing a cross-sectional view along line AA of FIG. 4B. This cross sectional view cuts through memory holes/vertical columns (NAND strings) 472 and 474 of region 470 (see FIG. 4B). The structure of FIG. 4C includes two drain side select layers SGD0 and SGD1; two source side select layers SGS0 and SGS; two drain side GIDL generation transistor layers SGDT0 and SGDT1; two source side GIDL generation transistor layers SGSB0 and SGSB1; two drain side dummy word line layers DD0 and DD1; two source side dummy word line layers DS0 and DS1; dummy word line layers DU and DL; one hundred and sixty two word line layers WL0-WL161 for connecting to data memory cells, and dielectric layers DL. Other embodiments can implement more or less than the numbers described above for FIG. 4C. In one embodiment, SGD0 and SGD1 are connected together; and SGS0 and SGS1 are connected together. In other embodiments, more or less number of SGDs (greater or lesser than two) are connected together, and more or less number of SGSs (greater or lesser than two) are connected together.

In one embodiment, erasing the memory cells is performed using GIDL, which includes generating charge carriers at the GIDL generation transistors such that the carriers get injected into the charge trapping layers of the NAND strings to change threshold voltage of the memory cells. FIG. 4C shows two GIDL generation transistors at each end of the NAND string; however, in other embodiments there are more or less than two. Embodiments that use GIDL at both sides of the NAND string may have GIDL generation transistors at both sides. Embodiments that use GIDL at only the drain side of the NAND string may have GIDL generation transistors only at the drain side. Embodiments that use GIDL at only the source side of the NAND string may have GIDL generation transistors only at the source side.

FIG. 4C shows two GIDL generation transistors at each end of the NAND string. It is likely that charge carriers are only generated by GIDL at one of the two GIDL generation transistors at each end of the NAND string. Based on process variances during manufacturing, it is likely that one of the two GIDL generation transistors at an end of the NAND string is best suited for GIDL. For example, the GIDL generation transistors have an abrupt p-n junction to generate the charge carriers for GIDL and, during fabrication, a phosphorous diffusion is performed at the polysilicon channel of the GIDL generation transistors. In some cases, the GIDL generation transistor with the shallowest phosphorous diffusion is the GIDL generation transistor that generates the charge carriers during erase. However, in some embodiments charge carriers can be generated by GIDL at multiple GIDL generation transistors at a particular side of the NAND string.

Memory holes/Vertical columns 472 and 474 are depicted protruding through the drain side select layers, source side select layers, dummy word line layers, GIDL generation transistor layers and word line layers. In one embodiment, each memory hole/vertical column comprises a vertical NAND string. Below the memory holes/vertical columns and the layers listed below is substrate 453, an insulating film 454 on the substrate, and source line SL. The NAND string of memory hole/vertical column 472 has a source end at a bottom of the stack (the source side) and a drain end at a top of the stack (bit line side). As in agreement with FIG. 4B, FIG. 4C show vertical memory hole/column 472 connected to bit line 414 via connector 417.

For ease of reference, drain side select layers; source side select layers, dummy word line layers, GIDL generation transistor layers and data word line layers collectively are referred to as the conductive layers. In one embodiment, the conductive layers are made from a combination of TiN and Tungsten. In other embodiments, other materials can be used to form the conductive layers, such as doped polysilicon, metal such as Tungsten, metal silicide, such as nickel silicide, tungsten silicide, aluminum silicide or the combination thereof. In some embodiments, different conductive layers can be formed from different materials. Between conductive layers are dielectric layers DL. In one embodiment, the dielectric layers are made from $SiO_2$. In other embodiments, other dielectric materials can be used to form the dielectric layers.

The non-volatile memory cells are formed along memory holes/vertical columns which extend through alternating conductive and dielectric layers in the stack. In one embodiment, the memory cells are arranged in NAND strings. The word line layers WL0-W161 connect to memory cells (also called data memory cells). Dummy word line layers connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. Drain side select layers SGD0 and SGD1 are used to electrically connect and disconnect NAND strings from bit lines. Source side select layers SGS0 and SGS1 are used to electrically connect and disconnect NAND strings from the source line SL.

FIG. 4C shows that the memory array is implemented as a two tier architecture, with the tiers separated by a Joint area. In one embodiment it is expensive and/or challenging to etch so many word line layers intermixed with dielectric layers. To case this burden, one embodiment includes laying down a first stack of word line layers (e.g., WL0-WL80) alternating with dielectric layers, laying down the Joint area, and laying down a second stack of word line layers (e.g., WL81-WL161) alternating with dielectric layers. The Joint areas are positioned between the first stack and the second stack. In one embodiment, the Joint areas are made from the same materials as the word line layers. In other embodiments, there can be no Joint area or multiple Joint areas.

Figure 4D:
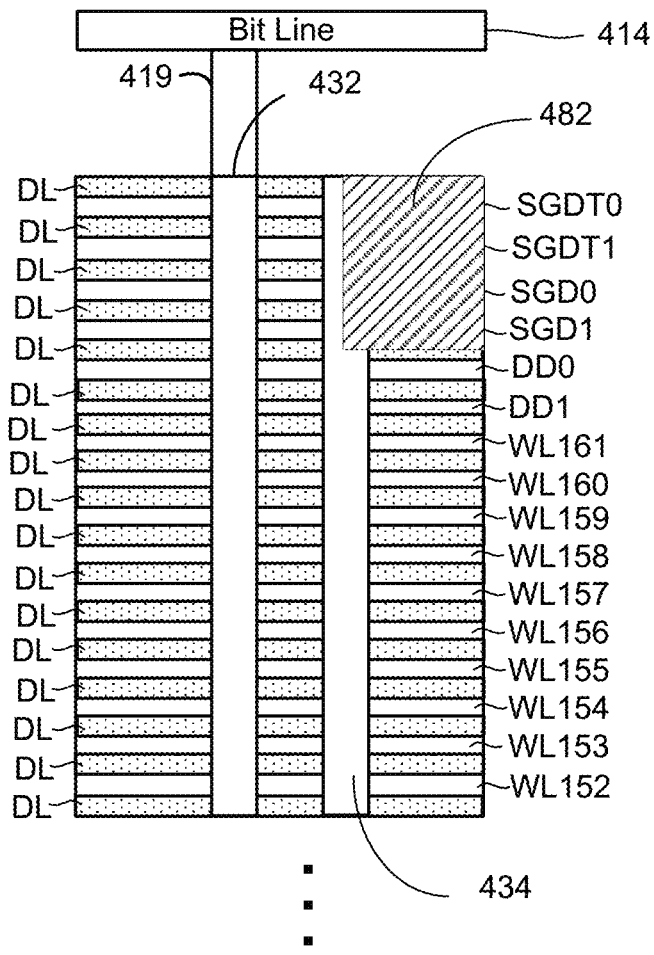
FIG. 4D depicts a cross sectional view of a portion of one embodiment of a block of memory cells.

FIG. 4D depicts a portion of one embodiment of a three dimensional memory structure 202 showing a cross-sectional view along line BB of FIG. 4B. This cross sectional view cuts through memory holes/vertical columns (NAND strings) 432 and 434 of region 430 (see FIG. 4B). FIG. 4D shows the same alternating conductive and dielectric layers as FIG. 4C. FIG. 4D also shows isolation region 482. Isolation regions 482, 484, and 486) occupy space that would have been used for a portion of the memory holes/vertical columns/NAND stings. For example, isolation region 482 occupies space that would have been used for a portion of memory hole/vertical column 434. More specifically, a portion (e.g., half the diameter) of vertical column 434 has been removed in layers SGDT0, SGDT1, SGD0, and SGD1 to accommodate isolation region 482 so that these layers can be independently controlled for the different sub-blocks SB0, SB1, SB2 and SB3. Thus, while most of the vertical column 434 is cylindrical (with a circular cross section), the portion of vertical column 434 in layers SGDT0, SGDT1, SGD0, and SGD1 has a semi-circular cross section. In one embodiment, after the stack of alternating conductive and dielectric layers is formed, the stack is etched to create space for the isolation region and that space is then filled in with $SiO_2$. In some embodiments, the bottom of the stack also has an isolation region with a similar structure as depicted in FIG. 4D for isolation region 482 at the top of the stack in order to remove portions of layers SGSB0, SGSB1, SGS0, and SGS1 so that these layers can be independently controlled for the different sub-blocks SB0, SB1. SB2 and SB3.

Figure 4E:
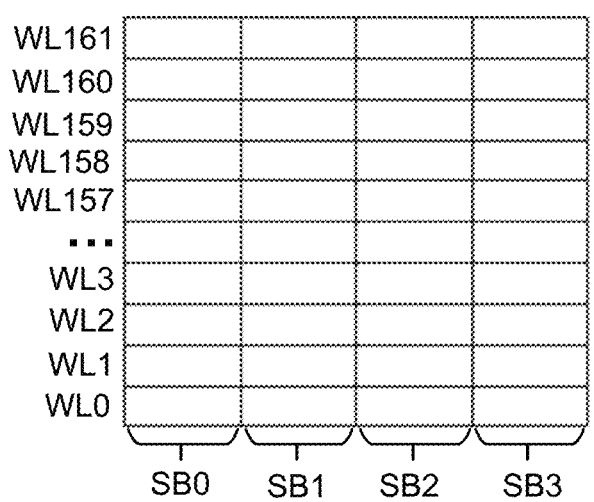
FIG. 4E is a block diagram depicting a block divided into sub-blocks.

FIG. 4E is a block diagram showing how a block (e.g., Block 2) is divided into sub-blocks SB0, SB1, SB2 and SB3. FIG. 4E shows all word lines WL0-WL161 connected to each of sub-blocks SB0, SB1, SB2 and SB3. Each of the sub-blocks includes multiple NAND strings connected to WL0-WL161.

Figure 4F:
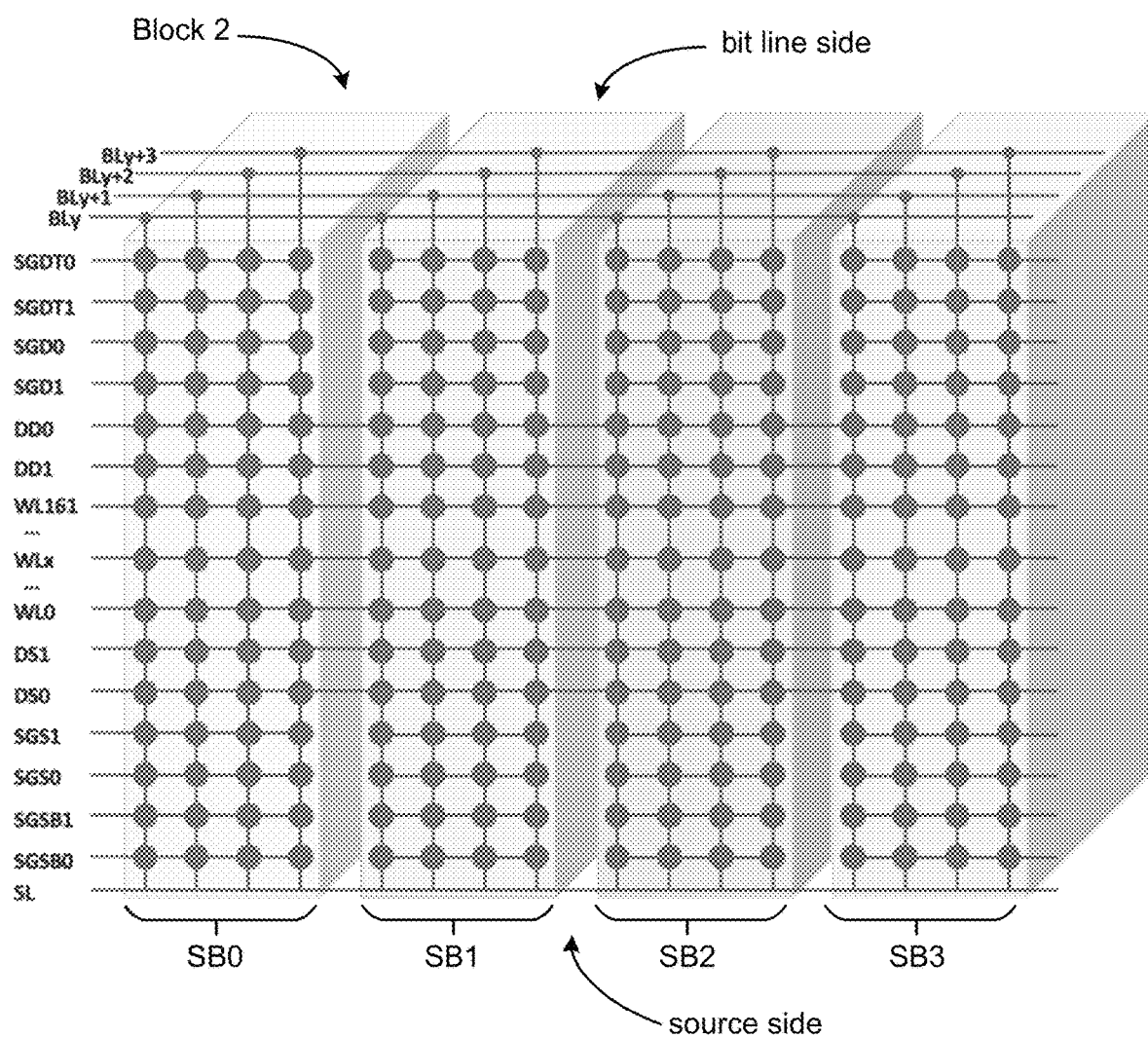
FIG. 4F is a block diagram depicting a block divided into sub-blocks.

FIG. 4F is another block diagram showing more detail of how a block (e.g., Block 2) is divided into sub-blocks SB0, SB1, SB2 and SB3. (The sub-blocks of the structure of FIG. 4F are sometimes referred to as "fingers" or "strings", but the sub-block terminology will be used here.) Block 2 is depicted as having a source side (same side as source line SL) and a bit line side (same side as bit lines). The bit line side is sometimes also known as the drain side. Each of the solid circles represents a memory cell. Word lines WL0-WL161 are connected to memory cells in sub-blocks SB0, SB1, SB2 and SB3. That is, each of the word lines WL0-WL161 are connected to all of the sub-blocks SB0, SB1, SB2 and SB3. In other words, all of the word lines WL0-WL161 connected to Block 2 are connected to all of the sub-blocks (SB0, SB1, SB2 and SB3) of Block 2 (including a sub-block selected for a memory operation and all sub-blocks that are unselected for the memory operation). In this manner, a voltage applied to a word line is applied to all sub-blocks (e.g., SB0, SB1, SB2 and SB3) of Block 2. FIG. 4F shows how drain side select layers SGD0 and SGD1, drain side (or bit line side) GIDL generation transistor layers SGDT0 and SGDT1, source side select layers SGS0 and SGS1, and source side GIDL generation transistor layers SGSB0 and SGSB1 are separated for each of sub-blocks SB0, SB1, SB2 and SB3 so that sub-blocks SB0, SB1, SB2 and SB3 can be independently controlled for programming, erasing and reading. Thus, while the source line SL is connected to all sub-blocks (SB0, SB1, SB2 and SB3) of Block 2, the source side select lines (SGS0 and SGS1), source side GIDL generation transistor control lines (SGSB0 and SGSB1), drain side select lines (SGD0 and SGD1), and drain (bit line) side GIDL generation transistor control lines (SGDT0 and SGDT1) are each connected to only one sub-block of the selected block. FIG. 4F also depicts a subset of the bit lines (e.g., Bly, Bly+1, Bly+2, Bly+3, . . . ), each of which is connected to one NAND string in each of sub-blocks SB0, SB1, SB2 and SB3 such that each bit line is separately connected to all sub-blocks of the block.

Figure 4G:
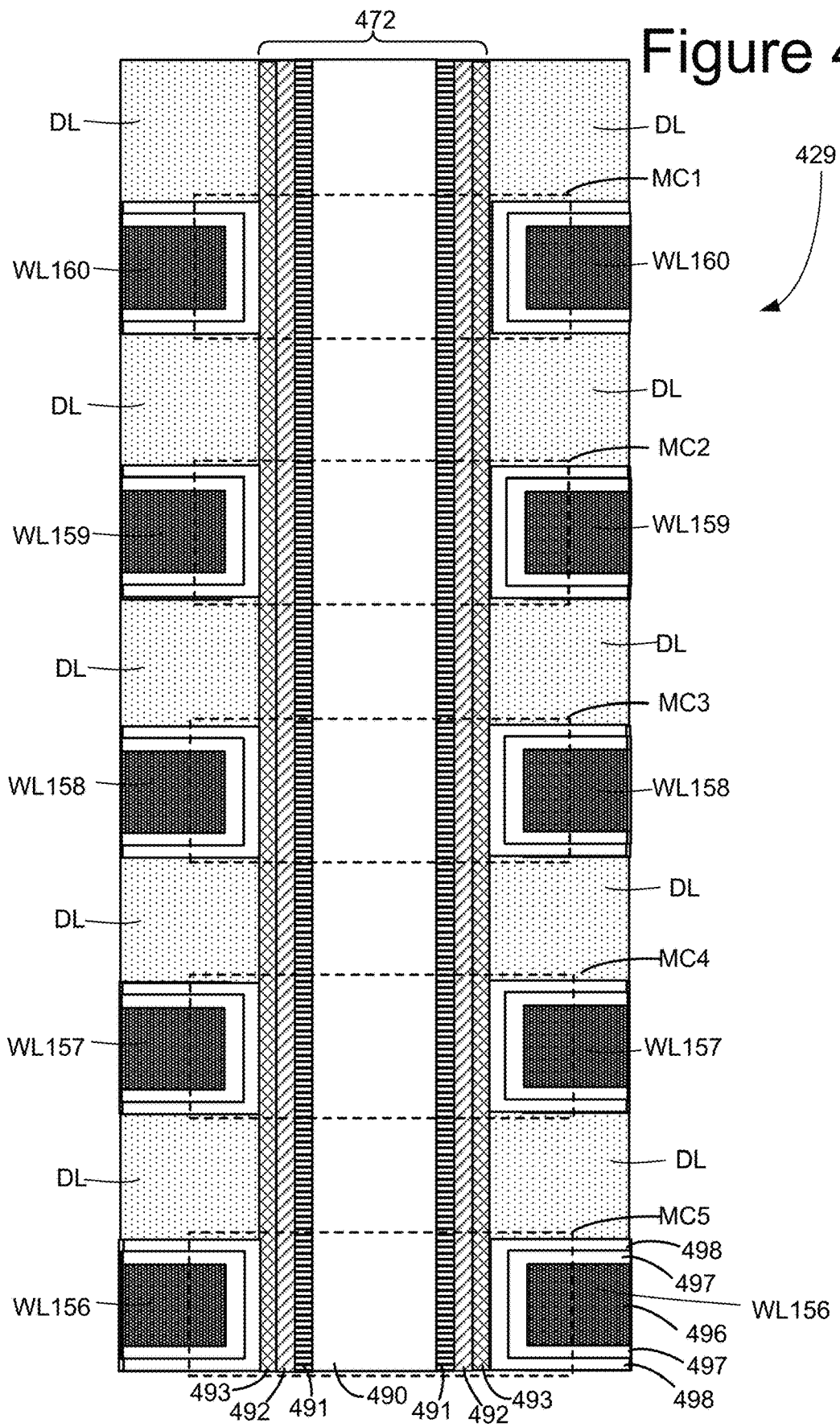
FIG. 4G is a cross sectional view of one embodiment of a portion of a vertical column of memory cells.

FIG. 4G depicts a cross sectional view of region 429 of FIG. 4C that includes a portion of memory hole/vertical column 472. In one embodiment, the memory holes/vertical columns are round; however, in other embodiments other shapes can be used. In one embodiment, memory hole/vertical column 472 includes an inner core layer 490 that is made of a dielectric, such as $SiO_2$. Other materials can also be used. Surrounding inner core 490 is polysilicon channel 491. Materials other than polysilicon can also be used. Note that it is the channel 491 that connects to the bit line and the source line. Surrounding channel 491 is a tunneling dielectric 492. In one embodiment, tunneling dielectric 492 has an ONO structure. Surrounding tunneling dielectric 492 is charge trapping layer 493, such as (for example) Silicon Nitride. Other memory materials and structures can also be used. The technology described herein is not limited to any particular material or structure.

FIG. 4G depicts dielectric layers DL as well as word line layers WL160, WL159, WL158, WL157, and WL156. Each of the word line layers includes a word line region 496 surrounded by an aluminum oxide layer 497, which is surrounded by a blocking oxide layer 498. In other embodiments, the blocking oxide layer can be a vertical layer parallel and adjacent to charge trapping layer 493. The physical interaction of the word line layers with the vertical column forms the memory cells. Thus, a memory cell, in one embodiment, comprises channel 491, tunneling dielectric 492, charge trapping layer 493, blocking oxide layer 498, aluminum oxide layer 497 and word line region 496. For example, word line layer WL160 and a portion of memory hole/vertical column 472 comprise a memory cell MC1. Word line layer WL159 and a portion of memory hole/vertical column 472 comprise a memory cell MC2. Word line layer WL158 and a portion of memory hole/vertical column 472 comprise a memory cell MC3. Word line layer WL157 and a portion of memory hole/vertical column 472 comprise a memory cell MC4. Word line layer WL156 and a portion of memory hole/vertical column 472 comprise a memory cell MC5. In other architectures, a memory cell may have a different structure; however, the memory cell would still be the storage unit.

When a memory cell is programmed, electrons are stored in a portion of the charge trapping layer 493 which is associated with (e.g. in) the memory cell. These electrons are drawn into the charge trapping layer 493 from the channel 491, through the tunneling dielectric 492, in response to an appropriate voltage on word line region 496. The threshold voltage (Vth) of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as GIDL.

Figure 4H:
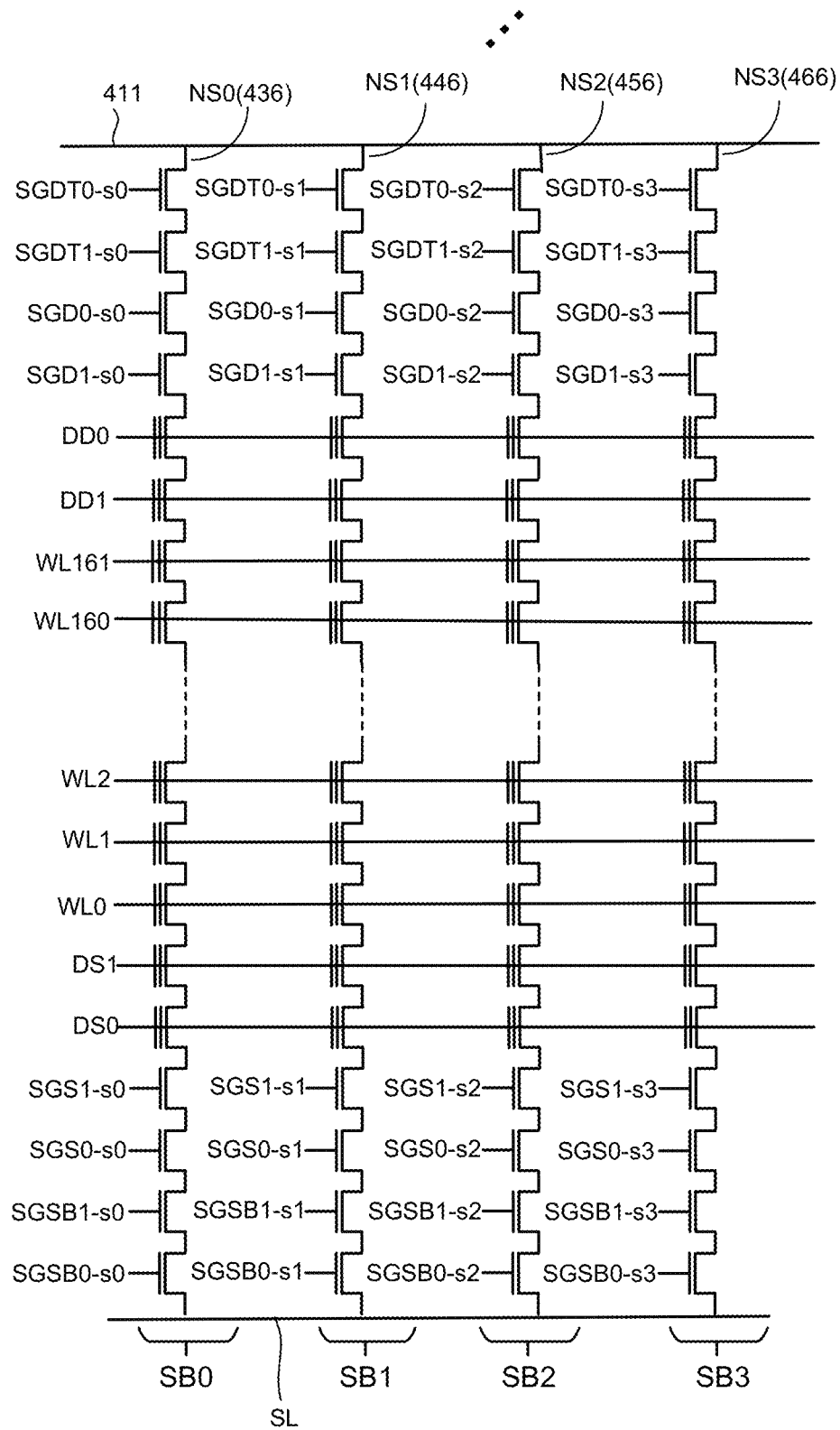
FIG. 4H is a schematic of a plurality of NAND strings in multiple sub-blocks of a same block.

FIG. 4H is a schematic diagram of a portion of the memory array 202 depicted in FIGS. 4-4G. FIG. 4H shows physical data word lines WL0-WL161 running across the entire block. The structure of FIG. 4H corresponds to portion 406 in Block 2 of FIG. 4A, including bit line 411. Within the block, in one embodiment, each bit line is connected to four NAND strings (one in each sub-block). Thus, FIG. 4H shows bit line 411 connected to NAND string NS0 (which corresponds to memory hole/vertical column 436 of sub-block SB0), NAND string NS1 (which corresponds to memory hole/vertical column 446 of sub-block SB1), NAND string NS2 (which corresponds to vertical column 456 of sub-block SB2), and NAND string NS3 (which corresponds to memory hole/vertical column 466 of sub-block SB3).

Drain side select line/layer SGD0 is separated by isolation regions (e.g., isolation regions 482, 484, and 486) to form SGD0-$s0$, SGD0-$s1$, SGD0-$s2$, and SGD0-$s3$ in order to separately connect to and independently control the sub-blocks (e.g., SB0, SB1, SB2 and SB3). Similarly, drain side select line/layer SGD1 is separated by isolation regions to form SGD1-$s0$, SGD1-$s1$, SGD1-$s2$, and SGD1-$s3$ in order to separately connect to and independently control the sub-blocks; drain (bit line) side GIDL generation transistor control line/layer SGDT0 is separated by isolation regions to form SGDT0-$s0$, SGDT0-$s1$, SGDT0-$s2$, and SGDT0-$s3$ in order to separately connect to and independently control the sub-blocks; drain (bit line) side GIDL generation transistor control line/layer SGDT1 is separated by isolation regions to form SGDT1-$s0$, SGDT1-$s1$, SGDT1-$s2$, and SGDT1-$s3$ in order to separately connect to and independently control the sub-blocks; source side select line/layer SGS0 is separated by isolation regions to form SGS0-$s0$, SGS0-$s1$, SGS0-$s2$, and SGS0-$s3$ in order to separately connect to and independently control the sub-blocks; source side select line/layer SGS1 is separated by isolation regions to form SGS1-$s0$, SGS1-$s1$, SGS1-$s2$, and SGS1-$s3$ in order to separately connect to and independently control the sub-blocks; source side GIDL generation transistor control line/layer SGSB0 is separated by isolation regions to form SGSB0-$s0$, SGSB0-$s1$, SGSB0-$s2$, and SGSB0-$s3$ in order to separately connect to and independently control the sub-blocks; and source side GIDL generation transistor control line/layer SGSB1 is separated by isolation regions to form SGSB1-$s0$, SGSB1-$s1$, SGSB1-$s2$, and SGSB1-$s3$ in order to separately connect to and independently control the sub-blocks.

SGD0-$s0$, SGD1-$s0$, SGDT0-$s0$, SGDT1-$s0$, SGS0-$s0$, SGS1-$s0$, SGSB0-$s0$, and SGSB1-$s0$, are connected to sub-block SB0. SGD0-$s1$, SGD1-$s1$, SGDT0-$s1$, SGDT1-$s1$, SGS0-$s1$, SGS1-$s1$, SGSB0-$s1$, and SGSB1-$s1$, are connected to sub-block SB1. SGD0-$s2$, SGD1-$s2$, SGDT0-$s2$, SGDT1-$s2$, SGS0-$s2$, SGS1-$s2$, SGSB0-$s2$, and SGSB1-$s2$, are connected to sub-block SB2. SGD0-$s3$, SGD1-$s3$, SGDT0-$s3$, SGDT1-$s3$, SGS0-$s3$, SGS1-$s3$, SGSB0-$s3$, and SGSB1-$s3$, are connected to sub-block SB03.

Although the example memories of FIGS. 4-4h are three dimensional memory structures that include vertical NAND strings with charge-trapping material, other (2D and 3D) memory structures can also be used with the technology described herein.

Figure 5A:
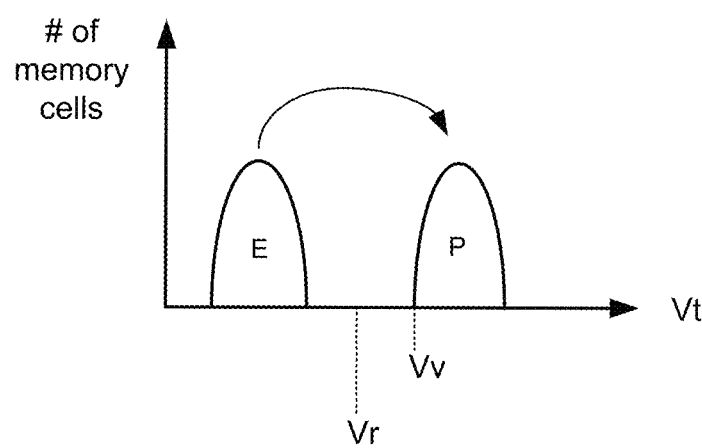
FIG. 5A depicts threshold voltage distributions.

The memory systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine whether a memory cells is erased (state E) or programmed (state P). FIG. 5A also depicts verify reference voltage Vv. In some embodiments, when programming memory cells to data state P, the system will test whether those memory cells have a threshold voltage greater than or equal to Vv.

Figure 5B:
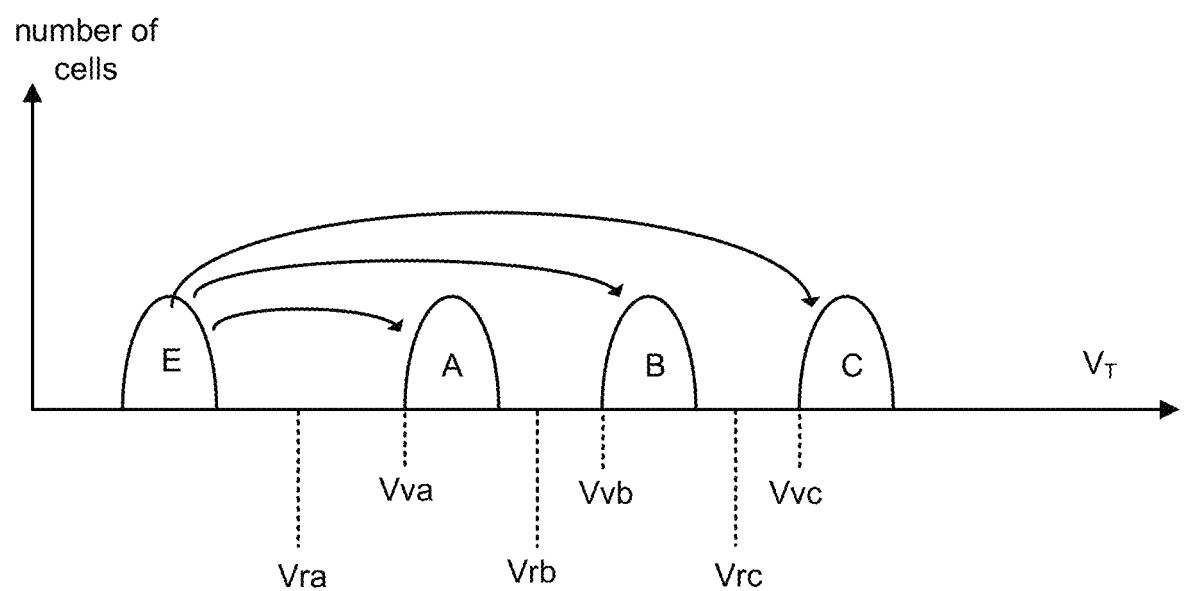
FIG. 5B depicts threshold voltage distributions.
Figure 5C:
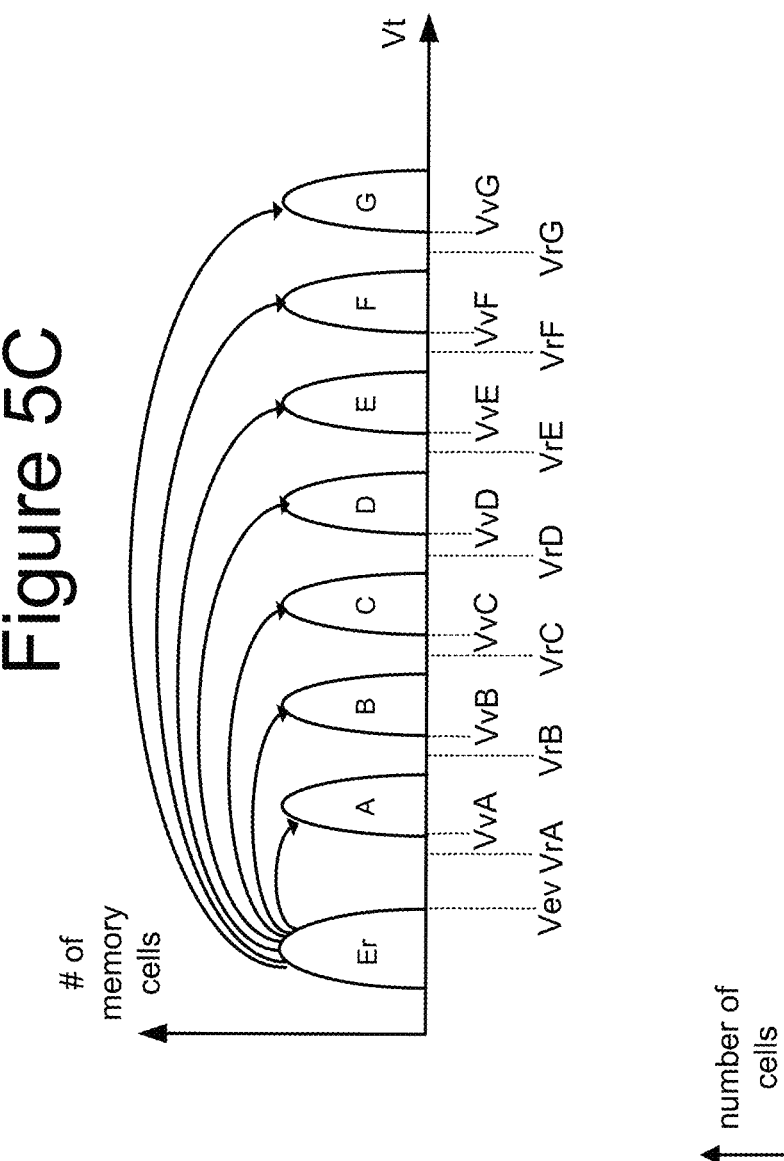
FIG. 5C depicts threshold voltage distributions.
Figure 5D:
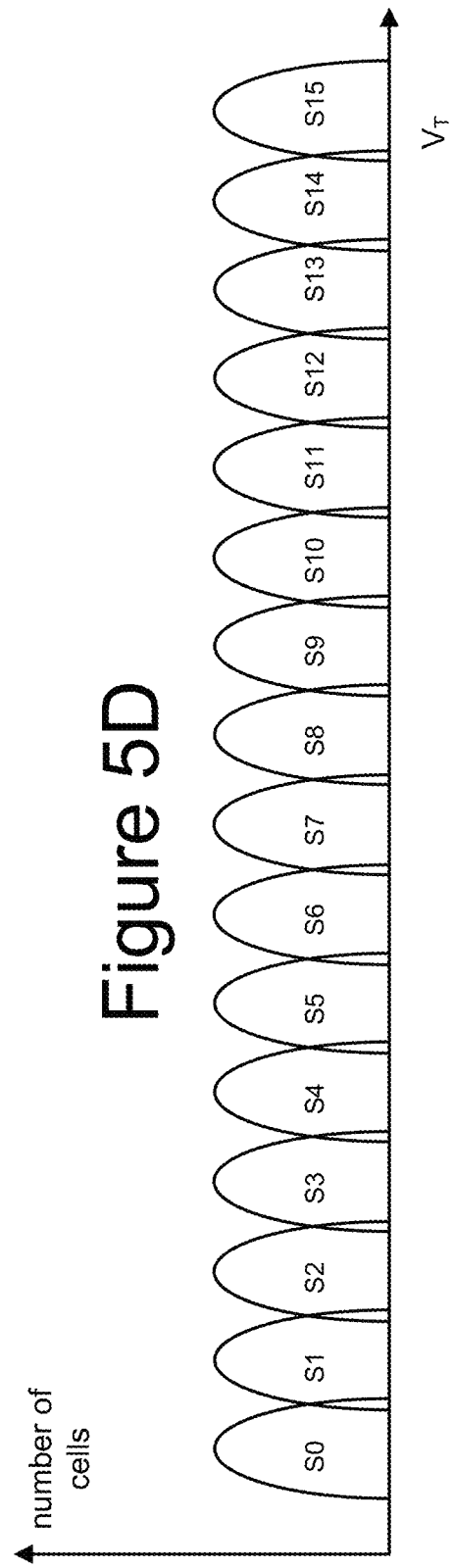
FIG. 5D depicts threshold voltage distributions.

FIGS. 5B-D illustrate example threshold voltage distributions for the memory array when each memory cell stores multiple bit per memory cell data. Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5B, each memory cell stores two bits of data. Other embodiments may use other data capacities per memory cell (e.g., such as three, four, or five bits of data per memory cell).

FIG. 5B shows a first threshold voltage distribution E for erased memory cells. Three threshold voltage distributions A, B and C for programmed memory cells are also depicted. In one embodiment, the threshold voltages in the distribution E are negative and the threshold voltages in distributions A, B and C are positive. Each distinct threshold voltage distribution of FIG. 5B corresponds to predetermined values for the set of data bits. In one embodiment, each bit of data of the two bits of data stored in a memory cell are in different logical pages, referred to as a lower page (LP) and an upper page (UP). In other embodiments, all bits of data stored in a memory cell are in a common logical page. The specific relationship between the data programmed into the memory cell and the threshold voltage levels of the cell depends upon the data encoding scheme adopted for the cells. Table 1 provides an example encoding scheme.

TABLE 1

|    | E | A | B | C |
|----|---|---|---|---|
| LP | 1 | 0 | 0 | 1 |
| UP | 1 | 1 | 0 | 0 |

In one embodiment, known as full sequence programming, memory cells can be programmed from the erased data state E directly to any of the programmed data states A, B or C using the process of FIG. 6 (discussed below). For example, a population of memory cells to be programmed may first be erased so that all memory cells in the population are in erased data state E. Then, a programming process is used to program memory cells directly into data states A, B, and/or C. For example, while some memory cells are being programmed from data state E to data state A, other memory cells are being programmed from data state E to data state B and/or from data state E to data state C. The arrows of FIG. 5B represent the full sequence programming. In some embodiments, data states A-C can overlap, with memory controller 120 (or control die 211) relying on error correction to identify the correct data being stored.

FIG. 5C depicts example threshold voltage distributions for memory cells where each memory cell stores three bits of data per memory cells (which is another example of MLC data). FIG. 5C shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. Table 2 provides an example of an encoding scheme for embodiments in which each bit of data of the three bits of data stored in a memory cell are in different logical pages, referred to as a lower page (LP), middle page (MP) and an upper page (UP).

TABLE 2

|    | Er | A | B | C | D | E | F | G |
|----|----|---|---|---|---|---|---|---|
| UP | 1  | 1 | 1 | 0 | 0 | 0 | 0 | 1 |
| MP | 1  | 1 | 0 | 0 | 1 | 1 | 0 | 0 |
| LP | 1  | 0 | 0 | 0 | 0 | 1 | 1 | 1 |

FIG. 5C shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in.

FIG. 5C also shows seven verify reference voltages, VvA, VvB, VvC, VvD, VvE, VvF, and VvG. In some embodiments, when programming memory cells to data state A, the system will test whether those memory cells have a threshold voltage greater than or equal to VvA. When programming memory cells to data state B, the system will test whether the memory cells have threshold voltages greater than or equal to VvB. When programming memory cells to data state C, the system will determine whether memory cells have their threshold voltage greater than or equal to VvC. When programming memory cells to data state D, the system will test whether those memory cells have a threshold voltage greater than or equal to VvD. When programming memory cells to data state E, the system will test whether those memory cells have a threshold voltage greater than or equal to VvE. When programming memory cells to data state F, the system will test whether those memory cells have a threshold voltage greater than or equal to VvF. When programming memory cells to data state G, the system will test whether those memory cells have a threshold voltage greater than or equal to VvG. FIG. 5C also shows Vev, which is an erase verify reference voltage to test whether a memory cell has been properly erased.

In an embodiment that utilizes full sequence programming, memory cells can be programmed from the erased data state Er directly to any of the programmed data states A-G using the process of FIG. 6 (discussed below). For example, a population of memory cells to be programmed may first be erased so that all memory cells in the population are in erased data state Er. Then, a programming process is used to program memory cells directly into data states A, B, C, D, E, F, and/or G. For example, while some memory cells are being programmed from data state Er to data state A, other memory cells are being programmed from data state Er to data state B and/or from data state Er to data state C, and so on. The arrows of FIG. 5C represent the full sequence programming. In some embodiments, data states A-G can overlap, with control die 211 and/or memory controller 120 relying on error correction to identify the correct data being stored. Note that in some embodiments, rather than using full sequence programming, the system can use multi-pass programming processes known in the art.

In general, during verify operations and read operations, the selected word line is connected to a voltage (one example of a reference signal), a level of which is specified for each read operation (e.g., see read reference voltages VrA, VrB, VlC, VrD, VrE, VrF, and VrG, of FIG. 5C) or verify operation (e.g. see verify reference voltages VvA, VvB, VvC, VvD, VvE, VvF, and VvG of FIG. 5C) in order to determine whether a threshold voltage of the concerned memory cell has reached such level. After applying the word line voltage, the conduction current of the memory cell is measured to determine whether the memory cell turned on (conducted current) in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

FIG. 5D depicts threshold voltage distributions when each memory cell stores four bits of data, which is another example of MLC data. FIG. 5D depicts that there may be some overlap between the threshold voltage distributions (data states) S0-S15. The overlap may occur due to factors such as memory cells losing charge (and hence dropping in threshold voltage). Program disturb can unintentionally increase the threshold voltage of a memory cell. Likewise, read disturb can unintentionally increase the threshold voltage of a memory cell. Over time, the locations of the threshold voltage distributions may change. Such changes can increase the bit error rate, thereby increasing decoding time or even making decoding impossible. Changing the read reference voltages can help to mitigate such effects. Using ECC during the read process can fix errors and ambiguities. Note that in some embodiments, the threshold voltage distributions for a population of memory cells storing four bits of data per memory cell do not overlap and are separated from each other. The threshold voltage distributions of FIG. 5D will include read reference voltages and verify reference voltages, as discussed above.

When using four bits per memory cell, the memory can be programmed using the full sequence programming discussed above, or multi-pass programming processes known in the art. Each threshold voltage distribution (data state) of FIG. 5D corresponds to predetermined values for the set of data bits. The specific relationship between the data programmed into the memory cell and the threshold voltage levels of the cell depends upon the data encoding scheme adopted for the cells. Table 3 provides an example of an encoding scheme for embodiments in which each bit of data of the four bits of data stored in a memory cell are in different logical pages, referred to as a lower page (LP), middle page (MP), an upper page (UP) and top page (TP).

TABLE 3

|    | S0 | S1 | S2 | S3 | S4 | S5 | S6 | S7 | S8 | S9 | S10 | S11 | S12 | S13 | S14 | S15 |
|----|----|----|----|----|----|----|----|----|----|----|-----|-----|-----|-----|-----|-----|
| TP | 1  | 1  | 1  | 1  | 1  | 0  | 0  | 0  | 0  | 0  | 1   | 1   | 0   | 0   | 0   | 1   |
| UP | 1  | 1  | 0  | 0  | 0  | 0  | 0  | 0  | 1  | 1  | 1   | 1   | 1   | 1   | 0   | 0   |
| MP | 1  | 1  | 1  | 0  | 0  | 0  | 0  | 1  | 1  | 0  | 0   | 0   | 0   | 1   | 1   | 1   |
| LP | 1  | 0  | 0  | 0  | 1  | 1  | 0  | 0  | 0  | 0  | 0   | 1   | 1   | 1   | 1   | 1   |

Figure 6:
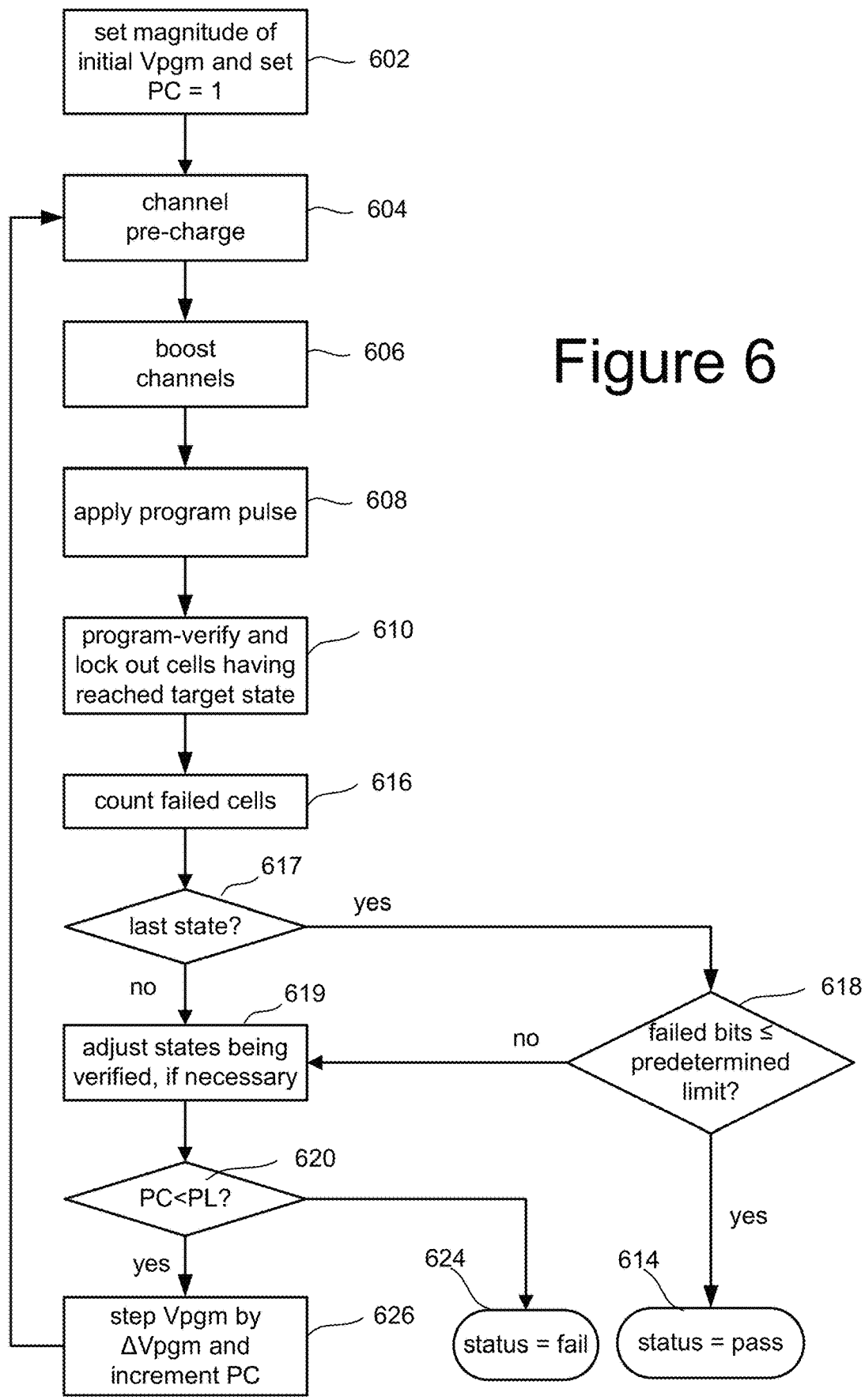
FIG. 6 is a flow chart describing one embodiment of a process for programming non-volatile memory.

FIG. 6 is a flowchart describing one embodiment of a process for programming memory cells. For purposes of this document, the term program and programming are synonymous with write and writing. In one example embodiment, the process of FIG. 6 is performed for memory array 202 using the one or more control circuits (e.g., system control logic 260, column control circuitry 210, row control circuitry 220) discussed above. In one example embodiment, the process of FIG. 6 is performed by integrated memory assembly 207 using the one or more control circuits (e.g., system control logic 260, column control circuitry 210, row control circuitry 220) of control die 211 to program memory cells on memory die 201. The process includes multiple loops, each of which includes a program phase and a verify phase. The process of FIG. 6 is performed to implement the full sequence programming, as well as other programming schemes including multi-stage programming. When implementing multi-stage programming, the process of FIG. 6 is used to implement any/each stage of the multi-stage programming process.

Typically, the program voltage applied to the control gates (via a selected data word line) during a program operation is applied as a series of program voltage pulses. Between program voltage pulses are a set of verify pulses (e.g., voltage pulses) to perform verification. In many implementations, the magnitude of the program voltage pulses is increased with each successive pulse by a predetermined step size. In step 602 of FIG. 6, the programming voltage signal (Vpgm) is initialized to the starting magnitude (e.g., ~12-16V or another suitable level) and a program counter PC maintained by state machine 262 is initialized at 1. In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 604 the control die will pre-charge channels of NAND strings that include memory cells connected to the selected word line that are to be inhibited from programming. In step 606, NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage is applied to the bit lines coupled with the unselected NAND string.

In step 608, a program voltage pulse of the programming voltage signal Vpgm is applied to the selected word line (the word line selected for programming). If a memory cell on a NAND string should be programmed, then the corresponding bit line is biased at a program enable voltage. In step 608, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 610, program-verify is performed, which includes testing whether memory cells being programmed have successfully reached their target data state. Memory cells that have reached their target states are locked out from further programming by the control die. Step 610 includes performing verification of programming by sensing at one or more verify reference levels. In one embodiment, the verification process is performed by testing whether the threshold voltages of the memory cells selected for programming have reached the appropriate verify reference voltage. In step 610, a memory cell may be locked out after the memory cell has been verified (by a test of the Vt) that the memory cell has reached its target state.

In one embodiment of step 610, a smart verify technique is used such that the system only verifies a subset of data states during a program loop (steps 604-628). For example, the first program loop includes verifying for data state A (see FIG. 5C), depending on the result of the verify operation the second program loop may perform verify for data states A and B, depending on the result of the verify operation the third program loop may perform verify for data states B and C, and so on.

In step 616, the number of memory cells that have not yet reached their respective target threshold voltage distribution are counted. That is, the number of memory cells that have, so far, failed to reach their target state are counted. This counting can be done by state machine 262, memory controller 120, or another circuit. In one embodiment, there is one total count, which reflects the total number of memory cells currently being programmed that have failed the last verify step. In another embodiment, separate counts are kept for each data state.

In step 617, the system determines whether the verify operation in the latest performance of step 610 included verifying for the last data state (e.g., data state G of FIG. 5C). If so, then in step 618, it is determined whether the count from step 616 is less than or equal to a predetermined limit. In one embodiment, the predetermined limit is the number of bits that can be corrected by error correction codes (ECC) during a read process for the page of memory cells. If the number of failed cells is less than or equal to the predetermined limit, then the programming process can stop and a status of "PASS" is reported in step 614. In this situation, enough memory cells programmed correctly such that the few remaining memory cells that have not been completely programmed can be corrected using ECC during the read process. In some embodiments, the predetermined limit used in step 618 is below the number of bits that can be corrected by error correction codes (ECC) during a read process to allow for future/additional errors. When programming less than all of the memory cells for a page, the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If in step 617 it was determined that the verify operation in the latest performance of step 610 did not include verifying for the last data state or in step 618 it was determined that the number of failed memory cells is not less than the predetermined limit, then in step 619 the data states that will be verified in the next performance of step 610 (in the next program loop) is adjusted as per the smart verify scheme discussed above. In step 620, the program counter PC is checked against the program limit value (PL). Examples of program limit values include 6, 12, 16, 19, 20 and 30; however, other values can be used. If the program counter PC is not less than the program limit value PL, then the program process is considered to have failed and a status of FAIL is reported in step 624. If the program counter PC is less than the program limit value PL, then the process continues at step 626 during which time the Program Counter PC is incremented by 1 and the programming voltage signal Vpgm is stepped up to the next magnitude. For example, the next pulse will have a magnitude greater than the previous pulse by a step size ΔVpgm (e.g., a step size of 0.1-1.0 volts). After step 626, the process continues at step 604 and another program pulse is applied to the selected word line (by the control die) so that another program loop (steps 604-626) of the programming process of FIG. 6 is performed.

In one embodiment memory cells are erased prior to programming. Erasing is the process of changing the threshold voltage of one or more memory cells from a programmed data state to an erased data state. For example, changing the threshold voltage of one or more memory cells from state P to state E of FIG. 5A, from states A/B/C to state E of FIG. 5B, from states A-G to state Er of FIG. 5C or from states S1-S15 to state S0 of FIG. 5D.

One technique to erase memory cells in some memory devices is to bias a p-well (or other types of) substrate to a high voltage to charge up a NAND channel. An erase enable voltage (e.g., a low voltage) is applied to control gates of memory cells while the NAND channel is at a high voltage to erase the memory cells. Herein, this is referred to as p-well erase.

Another approach to erasing memory cells is to generate gate induced drain leakage ("GIDL") current to charge up the NAND string channel. An erase enable voltage is applied to control gates of the memory cells, while maintaining the NAND string channel potential to erase the memory cells. Herein, this is referred to as GIDL erase. Both p-well erase and GIDL erase may be used to lower the threshold voltage (Vt) of memory cells.

In one embodiment, the GIDL current is generated by causing a drain-to-gate voltage at a GIDL generation transistor (e.g., transistors connected to SGDT0, SGDT1, SGSB0 and SGSB1). In some embodiments, a select gate (e.g., SGD or SGS) can be used as a GIDL generation transistor. A transistor drain-to-gate voltage that generates a GIDL current is referred to herein as a GIDL voltage. The GIDL current may result when the GIDL generation transistor drain voltage is significantly higher than the GIDL generation transistor control gate voltage. GIDL current is a result of carrier generation, i.e., electron-hole pair generation due to band-to-band tunneling and/or trap-assisted generation. In one embodiment, GIDL current may result in one type of carriers (also referred to a charge carriers), e.g., holes, predominantly moving into the NAND channel, thereby raising or changing the potential of the channel. The other type of carriers, e.g., electrons, are extracted from the channel, in the direction of a bit line or in the direction of a source line, by an electric field. During erase, the holes may tunnel from the channel to a charge storage region of the memory cells (e.g., to charge trapping layer 493) and recombine with electrons there, to lower the threshold voltage of the memory cells.

The GIDL current may be generated at either end (or both ends) of the NAND string. A first GIDL voltage may be created between two terminals of a GIDL generation transistor (e.g., connected to SGDT0, SGDT1) that is connected to or near a bit line to generate a first GIDL current. A second GIDL voltage may be created between two terminals of a GIDL generation transistor (e.g., SGSB0, SGSB1) that is connected to or near a source line to generate a second GIDL current. Erasing based on GIDL current at only one end of the NAND string is referred to as a one-sided GIDL erase. Erasing based on GIDL current at both ends of the NAND string is referred to as a two-sided GIDL erase. The technology described herein can be used with one-sided GIDL erase and two-sided GIDL erase.

Figure 7:
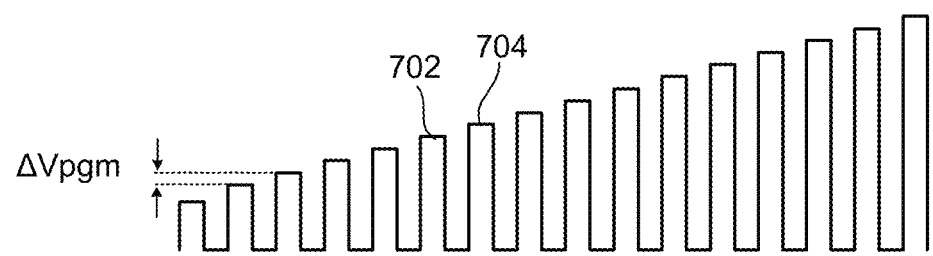
FIG. 7 depicts a voltage signal applied to a selected word line during programming.
Figure 8A:
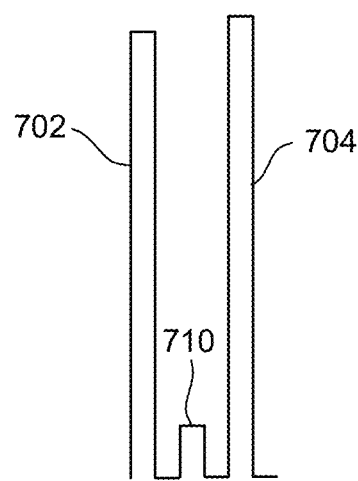
FIG. 8A depicts two program voltage pulses applied to a selected word line during programming and a verify voltage pulse between the two program voltage pulses.
Figure 8B:
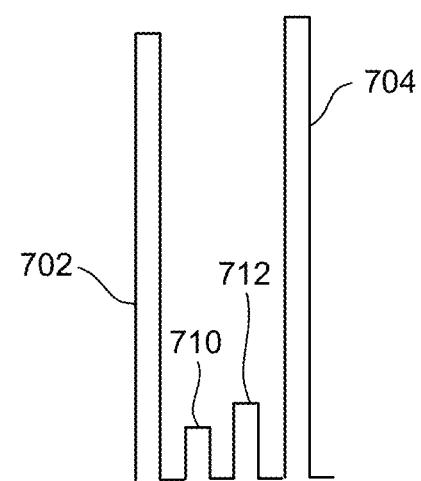
FIG. 8B depicts two program voltage pulses applied to a selected word line during programming and a verify voltage pulse between the two program voltage pulses.

FIG. 7 depicts the programming signal Vpgm as a series of program voltage pulses, such that one pulse of the programming signal Vpgm is applied at each performance of step 608 of FIG. 6. These program voltage pulses are one example of doses of programming applied to a plurality of non-volatile memory cells being programmed. In one embodiment, the program voltage pulses increase in voltage magnitude from pulse-to-pulse by a step size ΔVpgm. In some embodiments, ΔVpgm can change during a programming process. As described by FIG. 6, the system performs program-verification between the doses of programming (between or after programming voltage pulses), as depicted in FIGS. 8A and 8B. FIG. 8A, which illustrates an example in which program-verify is performed for one verify level, depicts two of the programming voltage pulses 702 and 704 of FIG. 7. Between programming voltage pulses 702 and 704 is verify voltage pulse 710. In one embodiment, verify voltage pulse 710 has a magnitude of any of the verify reference voltages VvA, VvB, VvC, VVD, VVE, VvF, and VvG (see FIG. 5C) and represents the system performing program-verify (step 610) between the doses of programming (successive iterations of step 608). In some embodiments, between programming voltage pulses the system will perform program-verify for multiple or all data states, while in other embodiments, the system will perform program-verify for one data state or a subset of data states.

FIG. 8B, which illustrates an example in which program-verify is performed for two data states, depicts two of the programming voltage pulses 702 and 704 of FIG. 7. Between programming voltage pulses 702 and 704 are verify voltage pulses 710 and 712. In one embodiment, verify voltage pulses 710 and 712 are for different data states. In other embodiments, there can be more than two verify voltage pulses between programming voltage pulses 702 and 704.

In prior art systems, the unit of erase is a block. However, there are instances when only a sub-block needs to be erased (e.g., because a file that is stored in only a sub-block needs to be erased). If only a sub-block needs to be erased it is more efficient to only erase the sub-block rather than the block. For example, only erasing a sub-block (rather than an entire block) saves time having to move valid data from the block to another block prior to the erase and saves the memory cells in the unselected sub-blocks from having to endure the stress of the erase process (which improves system endurance).

Figure 9:
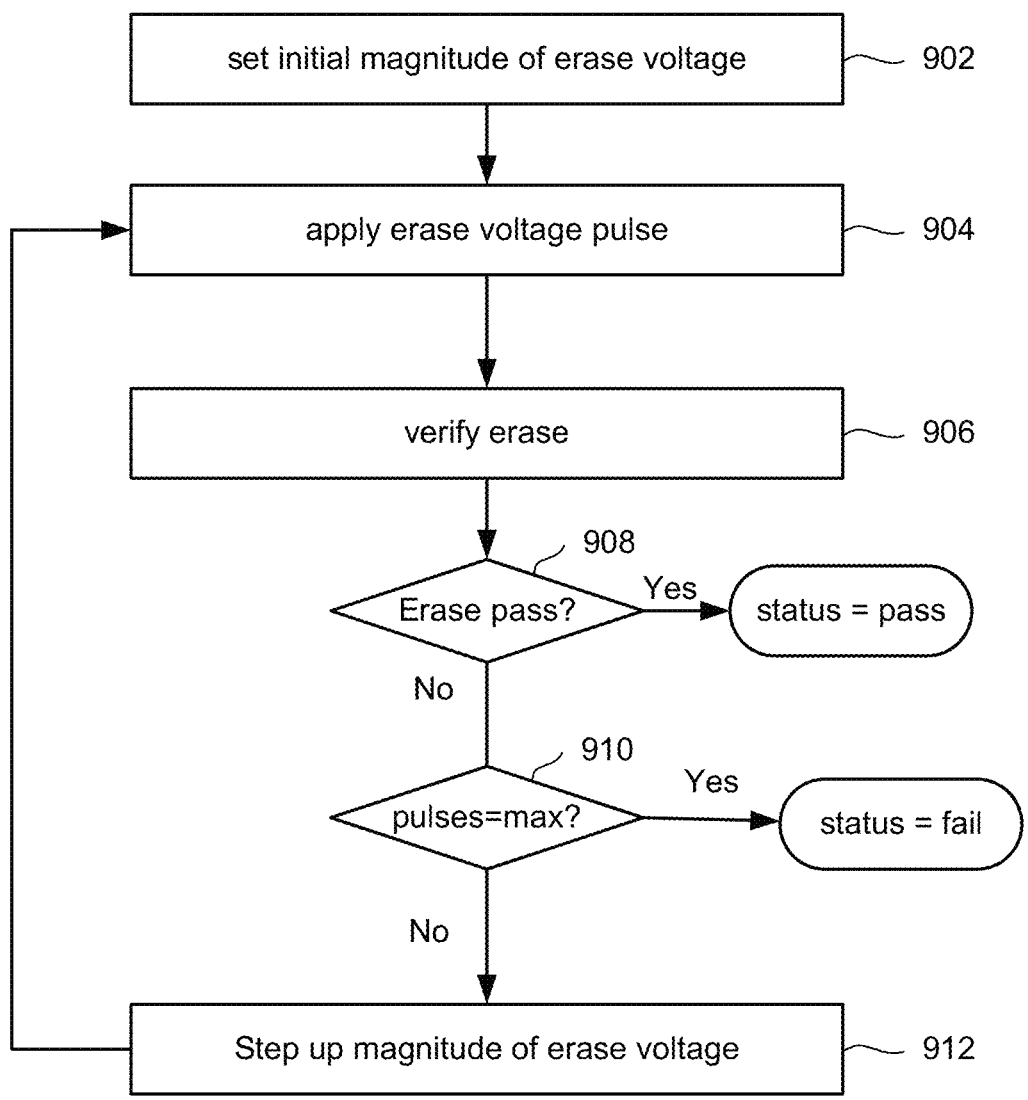
FIG. 9 is a flow chart describing one embodiment of a process for erasing non-volatile memory cells of a sub-block.

FIG. 9 is a flowchart describing one embodiment of a process for erasing memory cells of a sub-block. In one embodiment, the process of FIG. 9 can be performed by any one of the one or more control circuits discussed above. The process of FIG. 9 can be performed entirely by a control circuit on memory die 200 (see FIG. 2A) or entirely by a control circuit on integrated memory assembly 207 (see FIG. 2B), rather than by memory controller 120. In one example, the process of FIG. 9 is performed by or at the direction of state machine 262, using other components of System Control Logic 260, Column Control Circuitry 210 and Row Control Circuitry 220. In another embodiment, the process of FIG. 9 is performed by or at the direction of memory controller 120. The process of FIG. 9 can be performed on a memory implementing any of the structures depicted in FIGS. 1-4H, or other memory structures.

Step 902 of FIG. 9 includes setting an initial magnitude of an erase voltage that can be applied to the source line SL, bit lines or other signal lines. The initial erase voltage may have a relatively large magnitude such as, for example, 18 v. In some embodiment, the erase voltage is applied as a voltage pulse (erase voltage pulse). Step 904 includes applying the erase voltage pulse (or other waveform) to the source line and/or bit lines connected to the NAND strings in the selected block. Step 904 also includes applying erase support voltages (see e.g., FIG. 11) to other signal lines to enable GIDL erase in the selected sub-block of the selected block while preventing GIDL erase in the one or more unselected sub-blocks of the selected block.

In step 906, erase verify may be performed. The erase verify operation may apply for example VeV (See FIG. 5C) to each data word line (e.g., WL0-WL161) in the block. If all memory cells in the sub-block on a given NAND string have a Vt below VeV then the NAND string will conduct a significant current. In some embodiments, if a NAND string passes, erase of the NAND string may end at this point. Step 908 is a determination of whether erase is complete (status=pass) because all or enough NAND strings passed erase verify. If not, the system determines (in step 910) whether the maximum number of erase voltage pulses have been applied. If so, then the erase process has failed. If less than the maximum number of erase voltage pulses have been applied then the magnitude of the erase voltage may (optionally) be increased in step 912 and steps 904-910 are repeated.

Figure 10A:
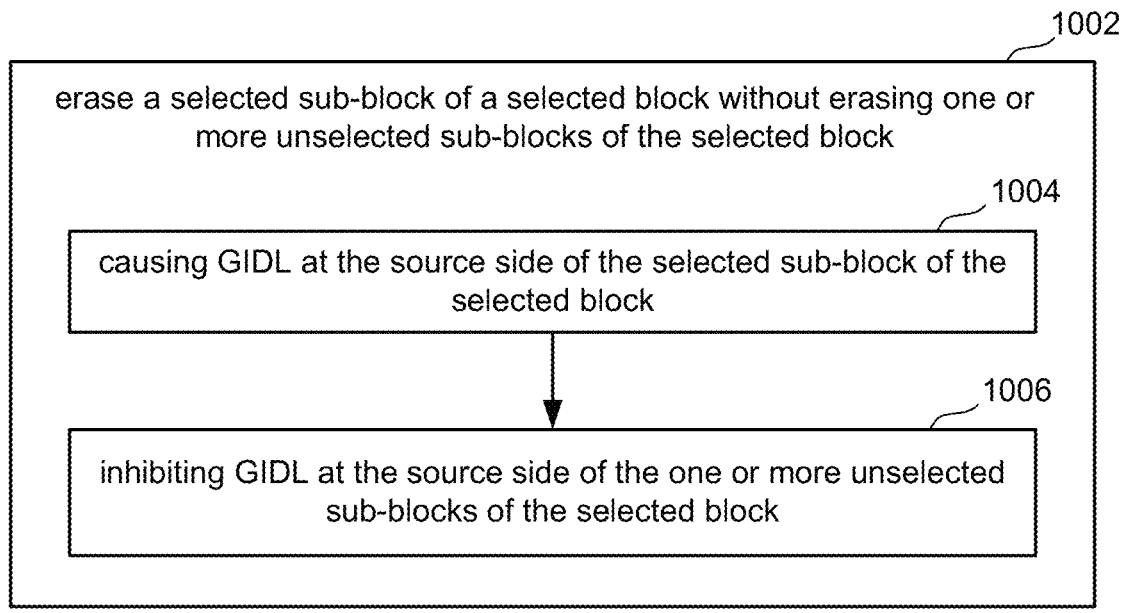
FIG. 10A is a flow chart describing one embodiment of a process performed during erasing of non-volatile memory.

FIG. 10A is a flow chart describing one embodiment of a process performed during erasing of non-volatile memory cells in a sub-block. In one embodiment, the process of FIG. 10A is performed during step 904 of FIG. 9. In another embodiment, the process of FIG. 10A is performed without being part of the process of FIG. 9. In another embodiment, the process of FIG. 9 is performed according to the process of FIG. 10A. In one embodiment, the process of FIG. 10A can be performed by any one of the one or more control circuits discussed above. The process of FIG. 10A can be performed entirely by a control circuit on memory die 200 (see FIG. 2A) or entirely by a control circuit on integrated memory assembly 207 (see FIG. 2B), rather than by memory controller 120. In one example, the process of FIG. 10A is performed by or at the direction of state machine 262, using other components of System Control Logic 260, Column Control Circuitry 210 and Row Control Circuitry 220. In another embodiment, the process of FIG. 10A is performed by or at the direction of memory controller 120. The process of FIG. 10A can be performed on a memory implementing any of the structures depicted in FIGS. 1-4H, or other memory structures.

Step 1002 of FIG. 10A includes erasing a selected sub-block of a selected block without erasing one or more unselected sub-blocks of the selected block. For example, assume sub-block SB1 is selected for erasing (see FIG. 4F) and sub-blocks SB0, SB2, and SB3 are unselected sub-blocks for this erase operation. Then the erase process will erase the memory cells of SB1 without erasing the memory cells of sub-blocks SB0, SB2, and SB3. In one embodiment, step 1002 comprises causing GIDL at the source side of the selected sub-block of the selected block (step 1004) and inhibiting GIDL at the source side of the one or more unselected sub-blocks of the selected block (step 1006). In some embodiments, step 1004 is performed concurrently with step 1006. GIDL is caused or inhibited at the source side separately/independently for each of the sub-blocks due to separate SGS0-s0, SGS1-s0, SGSB0-s0, SGSB1-s0, SGS0-s1, SGS1-s1, SGSB0-s1, SGSB1-s1, SGS0-s2, SGS1-s2, SGSB0-s2, SGSB1-s2, SGS0-s3, SGS1-s3, SGSB0-s3, and SGSB1-s3. Because all word lines connected to the selected block are connected to the selected sub-block of the selected block and the one or more unselected sub-blocks of the selected block (each word line of the set of word lines is connected to all sub-blocks of the selected block), the control circuit is configured to apply the same word line voltages for the selected sub-block of the selected block and the one or more unselected sub-blocks of the selected block.

One embodiment further includes erasing the selected sub-block of the selected block without erasing one or more unselected sub-blocks of the selected block by also causing GIDL at the bit line side of the selected sub-block of the selected block while inhibiting GIDL at the bit line side of the one or more unselected sub-blocks of the selected block. GIDL is caused or inhibited at the bit line side separately/independently for each of the sub-blocks due to separate SGD0-s0, SGD1-s0, SGDT0-s0, SGDT1-s0, SGD0-s1, SGD1-s1, SGDT0-s1, SGDT1-s1, SGD0-s2, SGD1-s2, SGDT0-s2, SGDT1-s2, SGD0-s3, SGD1-s3, SGDT0-s3, and SGDT1-s3. In this embodiment, each sub-block includes multiple source side GIDL generation transistors (e.g., SGSB0, SGSB1) that are closer to the source line than the bit lines, and each sub-block includes multiple bit line side GIDL generation transistors (e.g., SGDT0, SGDT1) that are closer to the bit lines than the source line.

Figure 10B:
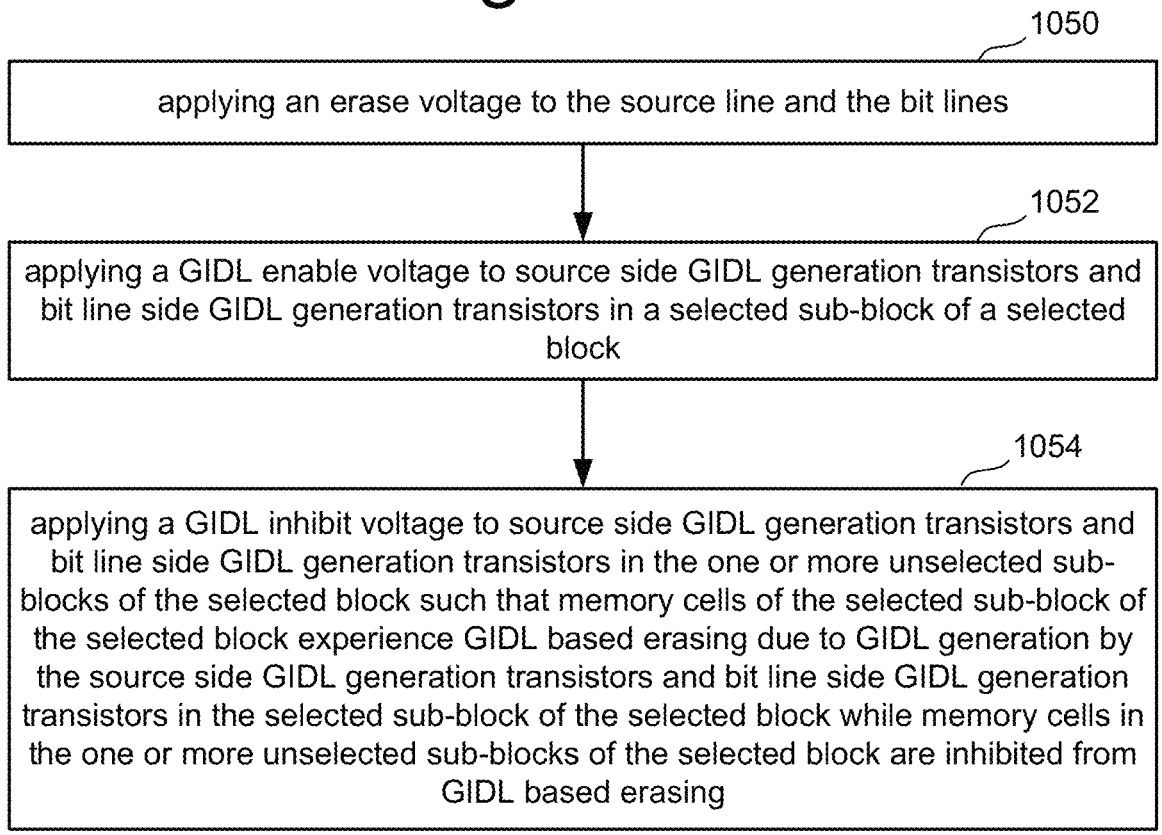
FIG. 10B is a flow chart describing one embodiment of a process performed during erasing of non-volatile memory.

FIG. 10B is a flow chart describing one embodiment of a process performed during erasing of non-volatile memory cells in a sub-block. In one embodiment, the process of FIG. 10B is performed during step 904 of FIG. 9. In another embodiment, the process of FIG. 10B is performed without being part of the process of FIG. 9. In another embodiment, the process of FIG. 9 is performed according to the process of FIG. 10B. In one embodiment, the process of FIG. 10B is an example implementation of the process of FIG. 10A.

In one embodiment, the process of FIG. 10B can be performed by any one of the one or more control circuits discussed above. The process of FIG. 10B can be performed entirely by a control circuit on memory die 200 (see FIG. 2A) or entirely by a control circuit on integrated memory assembly 207 (see FIG. 2B), rather than by memory controller 120. In one example, the process of FIG. 10B is performed by or at the direction of state machine 262, using other components of System Control Logic 260, Column Control Circuitry 210 and Row Control Circuitry 220. In another embodiment, the process of FIG. 10B is performed by or at the direction of memory controller 120. The process of FIG. 10B can be performed on a memory implementing any of the structures depicted in FIGS. 1-4H, or other memory structures.

Step 1050 of FIG. 10B comprises applying an erase voltage to the source line and the bit lines. Step 1052 includes applying a GIDL enable voltage to source side GIDL generation transistors and bit line side GIDL generation transistors in a selected sub-block of a selected block. Step 1054 includes applying a GIDL inhibit voltage to source side GIDL generation transistors and bit line side GIDL generation transistors in the one or more unselected sub-blocks of the selected block such that memory cells of the selected sub-block of the selected block experience GIDL based erasing due to GIDL generation by the source side GIDL generation transistors and bit line side GIDL generation transistors in the selected sub-block of the selected block while memory cells in the one or more unselected sub-blocks of the selected block are inhibited from GIDL based erasing. One embodiment of a structure that can perform the method of FIG. 10B includes a non-volatile memory structure comprising non-volatile memory cells grouped into blocks such that each block includes multiple sub-blocks, bit lines connected to the blocks, a source line connected to the blocks, and a set of word lines connected to the all of the sub-blocks of all of the blocks. Each sub-block includes multiple source side GIDL generation transistors that are closer to the source line than the bit lines and multiple bit line side GIDL generation transistors that are closer to the bit lines than the source lines.

Figure 11:
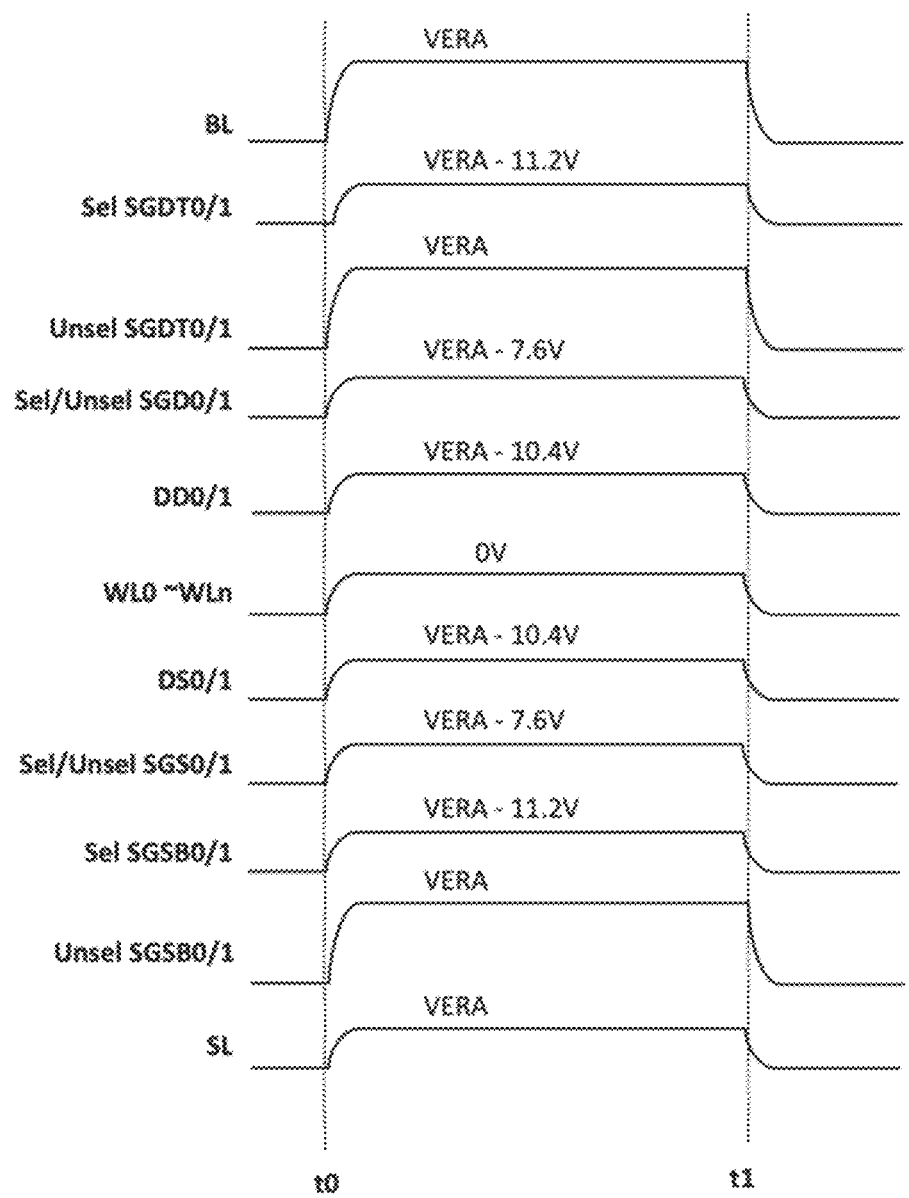
FIG. 11 is a signal timing diagram describing one embodiment of a process performed during erasing.

FIG. 11 is a signal timing diagram describing one embodiment of a process performed during erasing of non-volatile memory cells in a sub-block. The process depicted in FIG. 11 is an example implementation of step 904 of FIG. 9. The process depicted in FIG. 11 is also an example implementation of the process of FIG. 10A and an example implementation of the process of FIG. 10B. FIG. 11 describes the following signals: BL, Sel SGDT0/1, Unsel SGDT0/1, Sel/Unsel SGD0/1, DD0/1, WL0~WLn, DS0/1, Sel/Unsel SGS0/1, Unsel SGSB0/1, Sel SGSB0/1 and SL. The signal BL is the voltage applied to all of the bit lines connected to the block. The signal Sel SGDT0/1 is the voltage applied to SGDT0 and SGDT1 for the sub-block selected for erasing. For example, if sub-block SB1 is selected for erasing, then Sel SGDT0/1 is the voltage applied to SGDT0-$s1$ and SGDT1-$s1$. The signal Unsel SGDT0/1 is the voltage applied to SGDT0 and SGDT1 for the sub-blocks that are not selected for erasing. For example, if sub-block SB1 is selected for erasing, then Unsel SGDT0/1 is the voltage applied to SGDT0-$s0$, SGDT1-$s0$, SGDT0-$s2$, SGDT1-$s2$, SGDT0-$s3$, and SGDT1-$s3$. The signal Sel/Unsel SGD0/1 is the voltage applied to SGD0 and SGD1 for all sub-blocks of the selected block. Therefore, Sel/Unsel SGD0/1 is the voltage applied to SGD0-$s0$, SGD1-$s0$, SGD0-$s1$, SGD1-$s1$, SGD0-$s2$, SGD1-$s2$, SGD0-$s3$, and SGD1-$s3$. The signal DD0/1 is the voltage applied to DD0 and DD1. The signal WL0~WLn is the voltage applied to WL0-WL161. The signal DS0/1 is the voltage applied to DS0 and DS1. The signal Sel/Unsel SGS0/1 is the voltage applied to SGS0 and SGS1 for all sub-blocks of the selected block. Therefore, Sel/Unsel SGS0/1 is the voltage applied to SGS0-$s0$, SGS1-$s0$, SGS0-$s1$, SGS1-$s1$, SGS0-$s2$, SGS1-$s2$, SGS0-$s3$, and SGS1-$s3$. The signal SL is the voltage applied to the source line SL. The signal Unsel SGSB0/1 is the voltage applied to SGSB0 and SGSB1 for the sub-blocks that are not selected for erasing. For example, if sub-block SB1 is selected for erasing, then Unsel SGSB0/1 is the voltage applied to SGSB0-$s0$, SGSB1-$s0$, SGSB0-$s2$, SGSB1-$s2$, SGSB0-$s3$, and SGSB1-$s3$. The signal Sel SGSB0/1 is the voltage applied to SGSB0 and SGSB1 for the sub-block selected for erasing. For example, if sub-block SB1 is selected for erasing, then Sel SGSB0/1 is the voltage applied to SGSB0-$s1$ and SGSB1-$s1$.

All signals start at Vss (ground or 0v). At time t0, BL and SL are raised to VERA (e.g., 18 volts). VERA is an example of the erase voltage. Although FIG. 11 shows VERA applied to BL and SL as a voltage pulse, other waveforms can also be used. Also at time to, Sel SGDT0/1 is raised to VERA-11.2v, Unsel SGDT0/1 is raised to VERA, Sel/Unsel SGD0/1 is raised to VERA-7.6v, DD0/1 is raised to VERA-10.4v, WL0~WLn remains at 0v (or close to 0v), DS0/1 is raised to VERA-10.4v. Sel/Unsel SGS0/1 is raised to VERA-7.6v, Unsel SGSB0/1 is raised to VERA, and Sel SGSB0/1 is raised to VERA-11.2v.

In some embodiments, two conditions need to be met for GIDL to occur: (1) a high voltage (e.g., VERA) needs to be on BL and/or SL and (2) SGDT and/or SGSB needs to be low enough (e.g., VERA-11.2V). Thus, Sel SGSB0/1 (source side, as per steps 1004 and 1052) and Sel SGDT0/1 (bit line side) are raised to VERA-11.2v. To inhibit GIDL, Unsel SGSB0/1 (source side, as per steps 1006 and 1054) and Unsel SGDT0/1 (bit line side) are raised to VERA. Between t0 and t1, the memory cells in the selected sub-block experience an erase voltage pulse that lowers their threshold voltage toward the erased state. At time t1, all signals are lowered to Vss (ground or 0v). Note that the GIDL enable voltage (e.g., VERA-11.2v applied to Sel SGSB0/1 and Sel SGDT0/1) is lower in voltage magnitude than the GIDL inhibit voltage (VERA-applied to Unsel SGSB0/1 and Unsel SGDT0/1) and the erase voltage (VERA applied to SL and BL).

Figure 12:
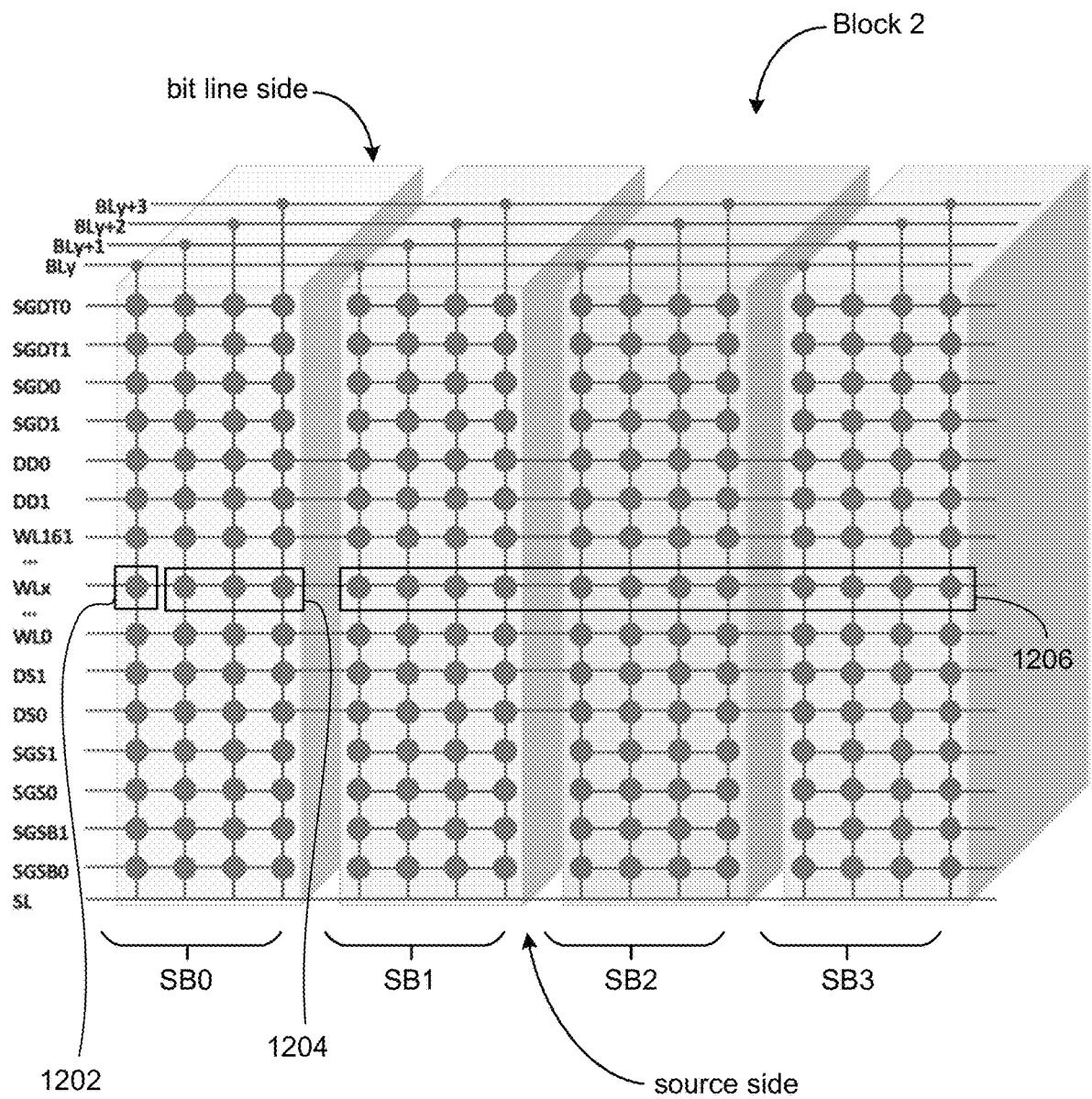
FIG. 12 is a block diagram depicting a block divided into sub-blocks.

In addition to separately and independently erasing sub-blocks, it is also proposed to separately and independently program sub-blocks. For example, FIG. 12 shows Block 2 with the intention of programming sub-block SB0 without programming data into the other sub-blocks (SB1, SB2, SB3) of the selected Block 2. As described above, the programming process of FIG. 6 concurrently programs data into multiple memory cells connected to a common word line. In the example of FIG. 12, data is being programmed into memory cells of SB0 connected to word line WLx. Due to the data pattern being programmed, some memory cells of SB0 connected to word line WLx will be programmed (see e.g., box 1202) and some memory cells of SB0 connected to word line WLx will be inhibited from programming (see e.g., box 1204). All memory cells of SB1/SB2/SB3 connected to word line WLx will be inhibited from programming (see e.g., box 1206).

Returning to considering erase, a conventional erase operation will commonly use a relatively "big" pulse with a width on the order of few milliseconds. In a typical implementation, a 3D NAND memory such as presented above will take two pulses to erase a block, with slow blocks or blocks near their end of life taking an additional pulse. The application of the erase pulses in the erase process places a memory array under a large amount of stress and is a main cause of such devices' wear and eventual failure. Therefore, if the Vth values of a block could be estimated after applying the first erase pulse and the second erase pulse's width tuned based on this position, then the erase time (tErase) can be decreased and cell endurance can be improved. For example, if, after a first erase pulse, an erase selected block's Vth distribution is very close to the target erase Vth position, a shorter pulse width can be used for the second erase pulse; and if the erase selected block's Vth distribution is very far from the target erase Vth position, the second erase pulse's duration can be appropriately increased in width to make if more likely that the erase verify is passed after the second pulse and a third erase pulse avoided. The following discussion presents an adaptive pulse width mode for the second and any latter erase pulses to improve erase time and memory cell endurance.

The following discussion will be discussed in context where erase is performed at the block level, but where the following erase verify operations can performed at sub-block level, where, depending on the embodiment, this can be the same as the sub-block structures described above or for other sub-divisions of the block. In particular, it should be noted that for the primary embodiments presented in the following, "sub-block" need not necessarily imply the ability to erase at the sub-block level (as described with respect to FIGS. 10A-11), program at the sub-block level (as described with respect to FIG. 12), or both, although some embodiments can incorporate these features. Consequently, in the following embodiments, the erase is will generally performed at the block level and the erase verifies will be at the sub-block level, where these can be the sub-blocks as presented above or other distinct sub-divisions of the erase block.

Figure 13:
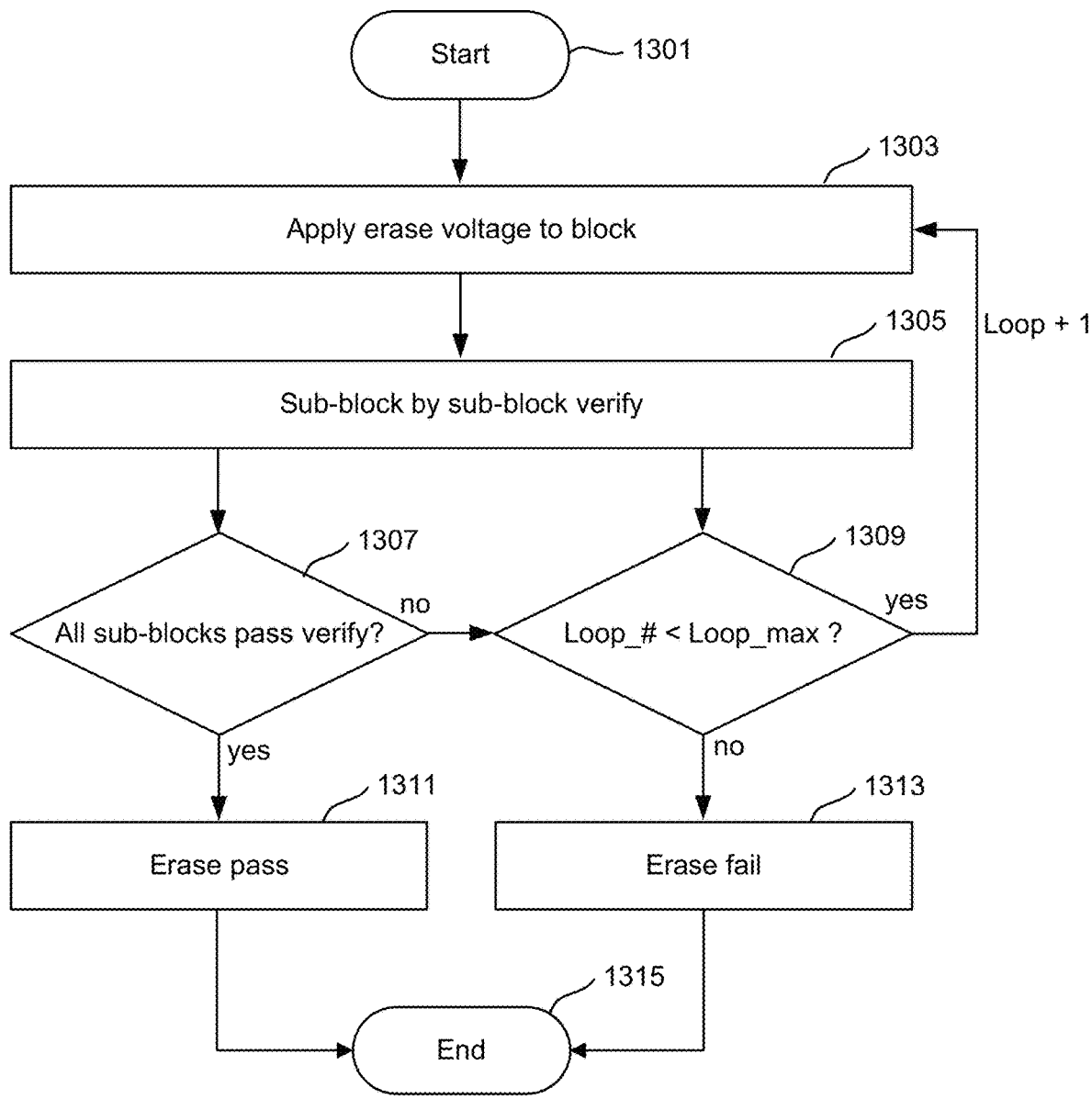
FIG. 13 is a flowchart for an erase process that incorporates a sub-block by sub-block verify, but not an adaptive pulse width.

FIG. 13 is a flowchart for an erase process that incorporates a sub-block by sub-block verify, but not an adaptive pulse width. In this way, FIG. 13 is similar FIG. 9, but with the incorporation of the sub-block by sub-block verify. The process starts at step 1301 when a memory die 200 or control die 211 receives an erase command for a selected block from a memory controller 120, where the command can be a host 102 command or generated on the controller 120, such as for a data relocation operation. At step 1303, the erase pulse operation is applied to the erase selected block, as described above with respect to steps 902 and 904 of FIG. 9 and FIG. 11, for example. The erase verify then follows at step 1305, which can again be done as in step 906 of FIG. 9, but is now performed on a sub-block by sub-block basis. As the erase verify level Vev is quite a low voltage and the resultant current drawn can be significant, it can be difficult to measure all of a block accurately. As block sizes increase, this exacerbates the problem. Use of a sub-block by sub-block erase verify as in step 1305 can help to manage the resultant peak current levels. In some embodiments, odd word line and even word line verifies for the erase selected block can be performed and compared to help detect defective blocks.

Step 1307 determines whether all of the sub-blocks pass the erase verify and, if so, an erase pass status results at step 1311, similarly to step 908. If any of the sub-blocks fail to verify, at step 1309 the loop count is checked (as in step 910) and if the maximum loop count has be reached, an erase fail status is issued at step 1313. If the maximum loop count has not been reached, the flow loops back to step 1303 and the loop count is incremented. Depending on the embodiment, the magnitude of the erase voltage Vera can be stepped up (as in step 912 of FIG. 9) for the next loop, but the pulse width stays the same in subsequent loops. Following the issue of either an erase pass status at step 1311 or an erase fail status at step 1313, the flow ends at step 1315.

Figure 14:
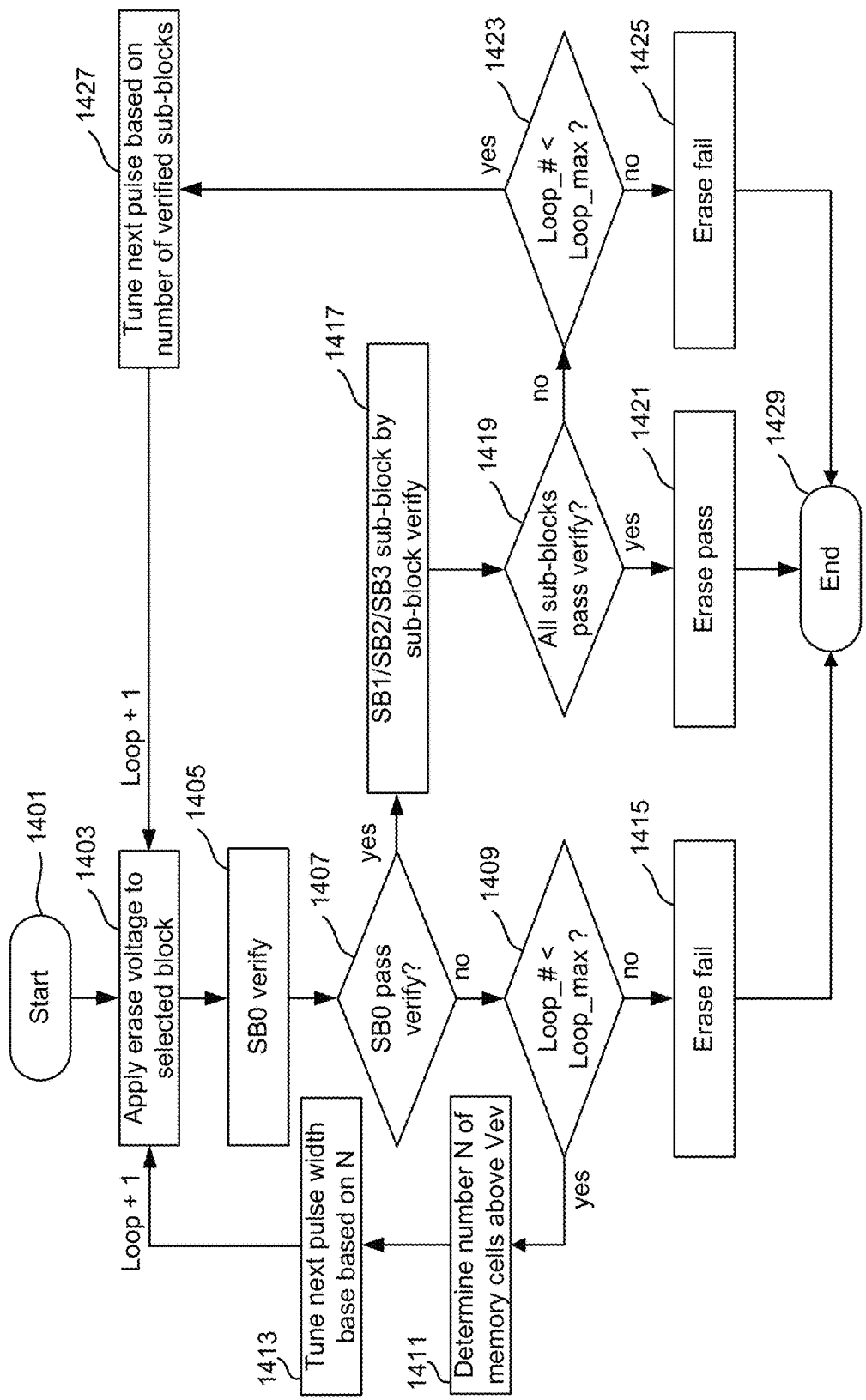
FIG. 14 is a flowchart for an erase process that incorporates a sub-block by sub-block verify and an adaptive pulse width.

FIG. 14 is a flowchart for an erase process that incorporates a sub-block by sub-block verify and an adaptive pulse width. At step 1401 the erase is started and a first erase pulse is applied to the erase selected memory block at step 1403, which can respectively be as described above with respect to steps 1301 and 1303 of FIG. 13. An erase verify is performed at step 1407, but only for one of the multiple sub-blocks. The example embodiment here is again a four sub-block embodiment, but other embodiments can use different numbers of sub-block. The sub-block verified at step 1405 in this example embodiment is SB0, but other embodiments can verify another of the sub-blocks and, is still other embodiments, the sub-block verified at step 1405 can change between loops. The erase verify can be as described above, but only for the one sub-block. For example, in some embodiments the verify of step 1407 (and of step 1417 discussed below) can erase verify even and odd word lines separately, with the results compared to evaluate whether the block is defective. If SB0 does not pass the verify, the loop count is checked at step 1409 to see whether the maximum loop value has been reached and, if so, at step 1415 an erase fail status is returned and the flow ends at step 1429.

If the loop count is below the maximum value, the flow loops back to step 1403 and increments the loop count, but also adapts the width of the next erase pulse at steps 1411 and 1413 prior to applying the that pulse for the next loop at step 1403. To determine the width of the following erase pulse, the number of memory cells above the erase verify level is determined at step 1411, with the width pulse accordingly tuned at step 1413. (The magnitude of the erase pulse can also be increased in magnitude (as in step 912 of FIG. 9), but the embodiments here only look at erase pulse duration.) An embodiment for these steps can be described with respect to FIGS. 15 and 16.

Figure 16:
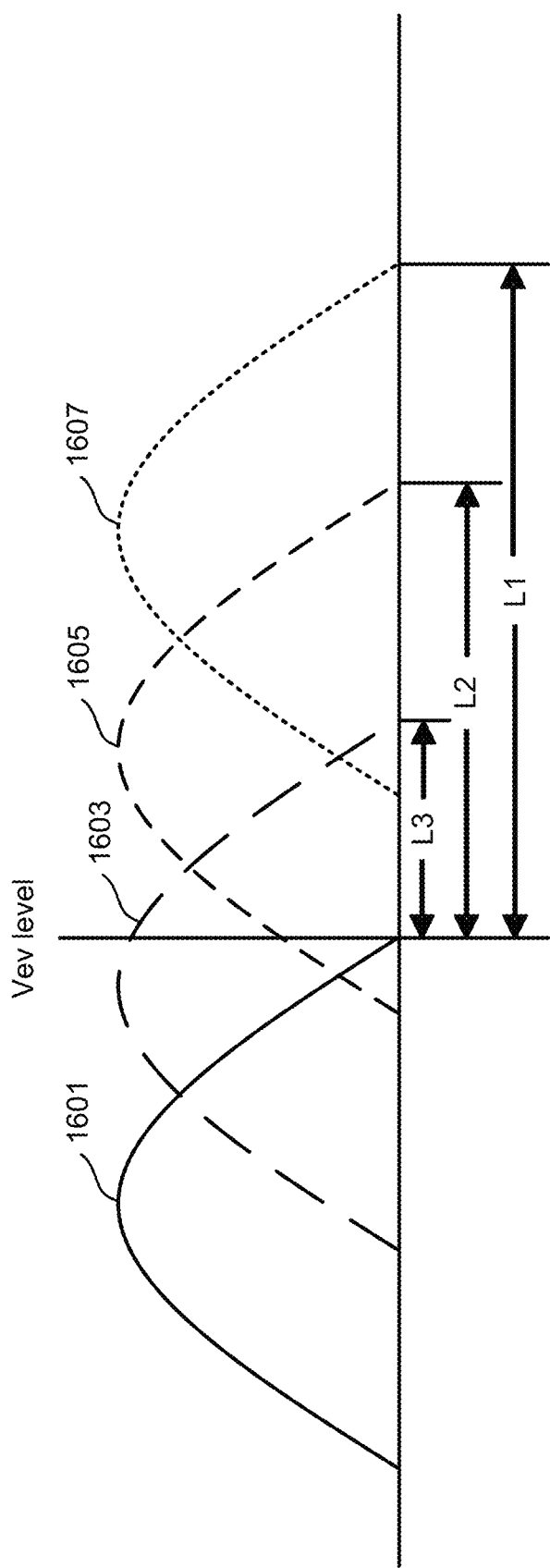
FIG. 16 illustrates examples of some distributions of memory cell Vth values after an erase pulse.

FIG. 15 is a table for an embodiment to determine the next erase pulse tuning based resultant distribution of memory cell Vth values after the preceding erase pulse, with FIG. 16 illustrating examples of such distributions. Considering FIG. 16, this shows four examples of a post-erase pulse distribution of the Vth values of memory cells for SB0. In the case of 1601, all of the Vth distribution (save for an acceptable number of outliers) is below the Vev voltage level and SB0 would pass erase verify in step 1407. For the other shown distributions, a significant portion of the distribution is above the Vev level. For example, in 1607, the upper end of the distribution is a distance L1 above Vev and the bulk of SB0's memory cells have a Vth above Vev. The distribution 1605 has its upper end a distance L2 above Vev, with most of the memory cells' Vth still above Vev, but quite a few of the memory below. The upper end of the distribution 1603 is closer to Vev and most of the memory cells have a Vth below Vev, but there are still too many above Vev for SB0 to verify as erased. For the case of 1607, the number N of non-verifying memory cells with Vth>Vev will be in a range N1<N<Nmax, for some value N1 and were Nmax is the total number of memory cells. For the distributions 1605 and 1603, the number N of non-verifying memory cells will respectively be in the range N2<N<N1 and 0<N<N2 for some parameter N2. Although each of the distributions 1603, 1605, and 1607 will fail to erase verify, the amount of additional erase needed will differ. The idea is to tune the duration of the next pulse to get SB0 to verify after the next pulse, but also not to overly erase the selected block, thereby reducing erase time and erase related stress.

Consequently, if SB0 fails to verify at step 1405, a significant number of the memory cells of the Vth distribution will be above the target Vev level. This number N is determined at step 1411 by counting how many cells of SB0 are above the erase verify level. This can determined by accumulating by the system control logic 260 of the non-verify results from the sense amps 230. Although shown in FIG. 14 as a step 1411 following step 1409, this could also be included as part of the SB0 verify of step 1405. This number N can then be used to estimate the current memory cell Vth distributions position and tune the width of the next pulse accordingly, such as illustrated in Table A of FIG. 15.

Table A of FIG. 15 has a first column corresponding the N value, a second column of the corresponding distance between the upper end of the current distribution and the target Vth value of Vev, and an amount by which the erase pulse should be tuned. The embodiment of FIG. 15 has three ranges:

If N1<N, tune next pulse width as PW_STD-DPW1;
If N2≤N<N1, tune next pulse width as PW_STD-DPW2; and
If 0≤N<N2 (no consider BSPF), tune next pulse width as PW_STD-DPW3.

Here, PW_STD is a standard pulse width of an erase operation, such as would be applied for the initial erase pulse. DPW1/DPW2/DPW3 are delta pulse widths for the next pulse width tuning. DPW1<DPW2<DPW3 and the values can be positive, negative or zero, since if the distance between current Vth distribution and the target Vev level is low, the control circuitry can appropriately decrease next pulse width; but if the distance is relatively large, the control circuitry appropriately increase next pulse width to attempt to verify pass after a second pulse and avoid a third pulse. For example, DPW1 may be negative, DPW2 zero or near zero, and DPW3 positive. The determination at step 1413 can be performed by the system control logic and the values for N1 and N2, as well as DPW1/DPW2/DPW3, can be parameter values stored in storage 266 for the control circuitry and determined as part of the device characterization process, along with the determination of the standard pulse width PW_STD. Although the example embodiment here uses three ranges, other embodiments can use greater or fewer numbers of ranges.

Returning to step 1407, if SB0 does pass verify, the other sub-blocks should also have Vth distributions close to the target Vev value and the other sub-blocks are verified on a sub-block by sub-block basis at step 1417. This can again be a standard erase verify operation as described above, but done sub-block by sub-block for each of (in this example SB1. SB2, and SB3) to determine how may sub-blocks verify, where this number can be used to estimate the Vth distribution of the block as a whole. If all sub-blocks pass at step 1419, an erase pass status is returned at step 1421 and the process ends at 1429. If one or more of the sub-blocks do not pass verify, an additional erase pulse can be applied if the maximum loop value has not been reached. The loop count is checked at step 1423 and if the loop number has reached the maximum value, an erase fail status is returned at step 1425 and the process ends at 1429. If the loop number is below the maximum, the loop count is incremented and the flow loops back to step 1403 for the next erase pulse, but with the next pulse tuned at step 1427, where an embodiment for this can be described with respect to FIGS. 17 and 18.

Figure 18:
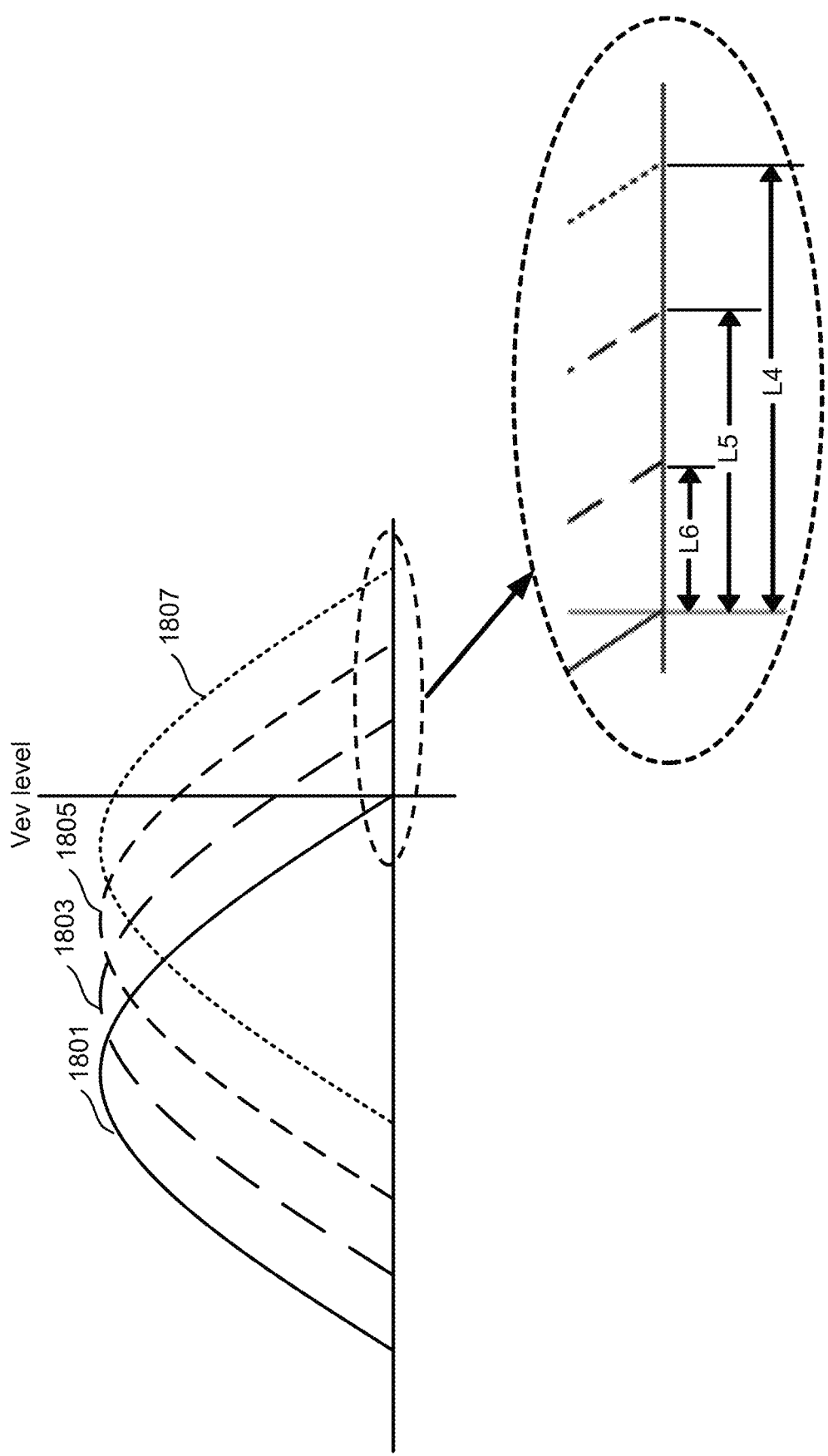
FIG. 18 illustrates examples of corresponding Vth distributions for the erase selected block for different numbers of verifying sub-blocks.

FIG. 17 is a table for an embodiment to determine the next erase pulse tuning based the verify results of sub-blocks in step 1417 after the preceding erase pulse, with FIG. 18 illustrating examples of corresponding Vth distributions for the erase selected block. As step 1417 is performed if SB0 verifies, the Vth distribution of the block as a whole will either also pass verify or be close to verifying (unless one of the sub-blocks is defective) so that the number (M in Table B of FIG. 17) of sub-blocks that do not verify can be used to estimate the blocks Vth distribution. This can then be used to tune the next pulse. This can be illustrated with respect to FIG. 18.

In FIG. 18, the distribution 1801 corresponds to when all sub-blocks will verify as erased. If only one of the sub-blocks fail to verify, the distribution is likely close to 1801, such as illustrated by the distribution 1803 whose upper tail extends a distance L6 (see detail in FIG. 18) above the Vev level. If two or three sub-blocks fail to verify, the distributions can be estimated to be as respectively shown at 1805 or 1807 with corresponding upper tails extending a distance L5 or LA above the Vev level. In step 1417, in one embodiment all of SB1, SB2, and SB3 can be individually verified to determine the number M of sub-blocks that do not pass verify. Alternately, as in the embodiment of Table B in FIG. 17, the verifies can be conditional, so that SB2 is only verified if SB1 passes and SB3 is only verified if SB2 passes, which can improve performance as fewer verify operations might be used.

Table B of FIG. 17 has a first column corresponding the M value, a second column of the corresponding estimated distance between the upper end of the current distribution and the target Vth value of Vev as illustrated in FIG. 18, and a third column with an amount by which the erase pulse should be tuned. The embodiment of FIG. 17 has three ranges:

If SB0 has passed verify but SB1/SB2/SB3 have not passed verify, M=3, tune next pulse width as PW_STD-DPW4;

If SB0/SB1 have passed verify but SB2/SB3 have not pass verify, M=2, tune next pulse width as PW_STD-DPW5; and If SB0/SB1/SB2 have passed verify but SB3 has not passed verify, M=1, tune next pulse width as PW_STD-DPW6.

Here, DPW4<DPW5<DPW6. All DPW1~DPW6 can be designed as trim parameters for next pulse width tuning. In some embodiments, sub-blocks that have pass verify in one loop can have their verify can be skipped in the next loop to reduce tErase. For example, if SB0 and SB1 pass verify but SB2 and SB3 verify fail in the first loop, in the second loop SB0/SB1 can skip the following verify and the flow can go directly the SB2/SB3 verifies. In additional variations, the following pulse could be applied to only non-verified sub-blocks.

Concerning the relative amounts of VERA pulse tuning, referring back to FIGS. 16 and 18, the distribution 1607 will require the longest pulse, where this can be longer than the first pulse to try to avoid a third pulse, while the distribution 1605 can use a second pulse similar or equal to the preceding pulse and the distribution 1603 can use a shorter following pulse. The distribution 1807 will need an even shorter following pulse, with the distributions 1805 and 1803 needing progressively further shortened following pulses. This can be illustrated with respect to FIG. 19.

Figure 19:
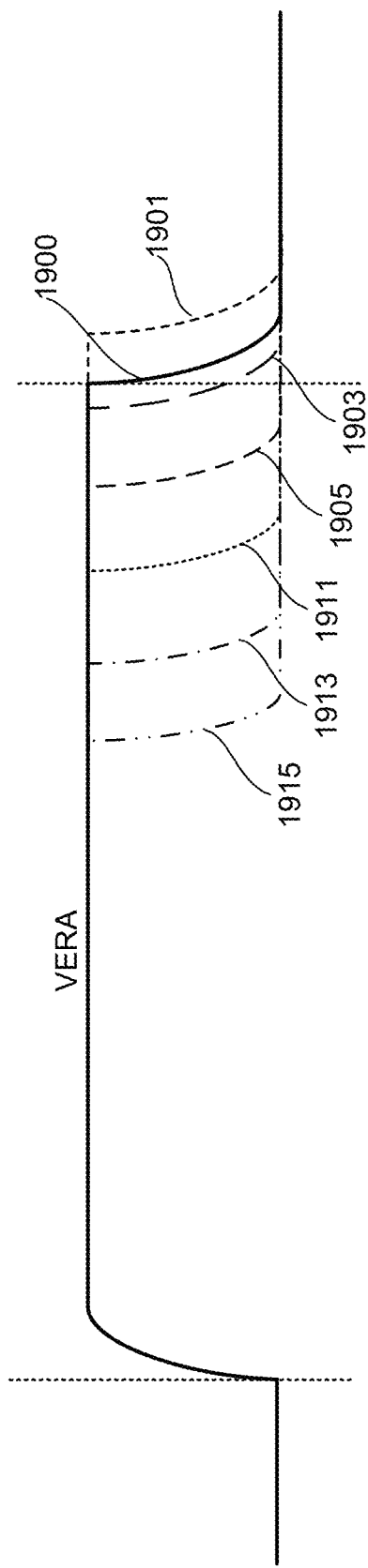
FIG. 19 illustrates the adaptive tuning of an erase pulse based on sub-block level erase verify.

FIG. 19 illustrates the adaptive tuning of an erase pulse based on sub-block level erase verify. The waveform 1900 is an erase pulse VERA as in FIG. 11 with the standard pulse width PW_STD. The waveform 1901 corresponds to DPW1 and waveform 1607/distance L1, where DPW1 is a negative value. The waveform 1903 corresponds to DPW2 and waveform 1605/distance L2 and shows a small positive DPW2 value, but, depending on the values determined as part of device characterization, DPW2 could be positive, negative, or zero. The waveform 1905 corresponds to DPW3 and waveform 1603/distance L3 is a positive value in this example. Waveforms 1911, 1913, and 1915 correspond to the determination of step 1427 for when SB0 has verified. The waveforms 1911, 1913, and 1915 respectively correspond to waveform 1807/distance L4, waveform 1805/distance L5, and waveform 1803/distance L6 and DPW4, DPW5, and DPW6. These delta values DPW1-DPW6, as well as the base PW_STD value, can be determined as part of the device characterization process and set as trim values.

Consequently, as described above, the use of an adaptive erase pulse duration based on sub-block level erase verify can both save on erase times and improve endurance. Although described with reference to particular embodiments, the techniques can be extended to more general situations. For example, although the tables of FIGS. 15 and 17 have three ranges, other embodiments can have more or less numbers of ranges. Additionally, although the discussion has be based on sub-blocks, other divisions of a memory array can be used. For example, within the NAND memory context, but without sub-blocks, a block can be divided into other sub-divisions, such as distinct sets of NAND strings.

One embodiment includes a non-volatile memory system, comprising a control circuit configured to connect to an array of non-volatile memory cells comprising a plurality of blocks, each of the blocks comprising a plurality of sub-blocks. The control circuit is configured to: apply a first erase pulse of a first duration to a selected one of the blocks; subsequent to applying the first erase pulse to the selected block, individually erase verify one or more of the sub-blocks of the selected block; in response to less than all of the sub-blocks verifying as erased, apply a second erase pulse of a second duration to the selected block; and prior to applying the second erase pulse to the selected block, determine the second duration based on a number of the sub-blocks of the selected block that do not verify as erased.

One embodiment includes a method comprising: applying a first erase pulse of a first duration to a block of an array of non-volatile memory cells, the array having a NAND architecture in which the block includes a plurality of distinct subsets of NAND strings; subsequent to applying the first erase pulse to the block, erase verifying a first of the distinct subsets, but not others of the distinct subsets, of the block; in response to the first subset not passing the erase verify, determining a number of memory cells of the first subset that do have a threshold voltage above an erase verify level; based on the number of memory cells of the first subset that have the threshold voltage above the erase verify level, determining a second duration for a second erase pulse; and applying the second erase pulse of the second duration to the block.

One embodiment includes a non-volatile memory system, comprising: an array of non-volatile memory cells having a NAND architecture and comprising a plurality of blocks, each of the blocks comprising a plurality of sub-blocks; means for applying a plurality of erase pulses to a selected block of the array; means for sequentially erase verifying the sub-blocks, beginning with a first of the sub-blocks, of the selected block subsequent to applying each of the erase pulses thereto; and means for determining a duration for the erase pulses. The means for determining the erase pulses can determine the duration for by: subsequent to applying a first erase pulse, erase verifying the first sub-block of the selected block and, in response to the first sub-block not passing the erase verifying, determining a number of memory cells of the first sub-block that have a threshold voltage above an erase verify level; and based on the number of memory cells of the first sub-block that have the threshold voltage above the erase verify level, determining a duration for a subsequent, second erase pulse.

The means for applying a plurality of erase pulses to a selected block of the array can include the row control circuitry 220 and the column control circuitry 210 under the supervision of the system control logic, such as described above with respect to FIG. 11. The means for determining the number of memory cells of the first sub-block that have a threshold voltage above an erase verify level can also include the row control circuitry 220 and the column control circuitry 210, including sense amplifiers 230, under the supervision of the system control logic as described with respect to FIG. 5C. The means for determining the erase pulses can determine the duration can include the For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory system, comprising:
a control circuit configured to connect to an array of non-volatile memory cells comprising a plurality of blocks, each of the blocks comprising a plurality of sub-blocks, the control circuit configured to:
apply a first erase pulse of a first duration to a selected one of the blocks;
subsequent to applying the first erase pulse to the selected block, individually erase verify one or more of the sub-blocks of the selected block, including:
erase verifying a first sub-block of the selected block, including determining a number of memory cells of the first sub-block having a voltage threshold above an erase verify level;
in response to less than all of the sub-blocks verifying as erased, apply a second erase pulse of a second duration to the selected block; and
prior to applying the second erase pulse to the selected block, determine the second duration based on a number of the sub-blocks of the selected block that do not verify as erased and on the number of the memory cells of the first sub-block having the voltage threshold above the erase verify level.

2. The non-volatile memory system of claim 1, wherein the array is on a first die and the control circuit is on a second die, separate from and bonded to the first die.

3. The non-volatile memory system of claim 1, wherein the second duration is greater than the first duration.

4. The non-volatile memory system of claim 1, wherein the second duration is less than the first duration.

5. The non-volatile memory system of claim 1, wherein to individually erase verify one or more of the sub-blocks of the selected block the control circuit is further configured to:
in response to the first sub-block not verifying as erased, individually erase verify one or more additional sub-blocks of the selected block; and
further determine the second duration based on a number of the one or more additional sub-blocks of the selected block that do not verify as erased.

6. The non-volatile memory system of claim 1, wherein the control circuit is further configured to:
in response to less than all of the sub-blocks verifying as erased and prior to applying the second erase pulse, determine whether the second erase pulse would exceed a maximum number of erase pulses; and in response to determining that the second erase pulse would exceed the maximum number of erase pulses, not apply the second erase pulse and return an erase fail status.

7. The non-volatile memory system of claim 1, wherein the control circuit is further configured to:
in response to all of the sub-blocks verifying as erased, not apply the second erase pulse and return an erase pass status.

8. The non-volatile memory system of claim 1, further comprising:
the array of non-volatile memory cells, the array having a three dimensional NAND architecture in which a plurality of NAND run vertically relative to a horizontal substrate.

9. A method, comprising:
applying a first erase pulse of a first duration to a block of an array of non-volatile memory cells, the array having a NAND architecture in which the block includes a plurality of distinct subsets of NAND strings;
subsequent to applying the first erase pulse to the block, erase verifying a first of the distinct subsets, but not others of the distinct subsets, of the block;
in response to the first subset not passing the erase verify, determining a number of memory cells of the first subset that do have a threshold voltage above an erase verify level;
based on the number of memory cells of the first subset that have the threshold voltage above the erase verify level, determining a second duration for a second erase pulse; and
applying the second erase pulse of the second duration to the block.

10. The method of claim 9, wherein the distinct subsets of the block are sub-blocks.

11. The method of claim 9, further comprising:
in response to the first subset passing the erase verify, individually erase verifying one or more additional subsets of the block; and
in response to less than all of the additional subsets verifying as erased, determining the second duration based on a number of subsets that do not verify as erased.

12. The method of claim 11, wherein individually erase verifying one or more additional subsets of the block comprises:
erase verifying a first of the additional subsets; and
in response to the first of the additional subsets not verifying, erase verifying a second of the additional subsets.

13. The method of claim 11, wherein individually erase verifying one or more additional subsets of the block comprises erase verifying all of the additional subsets and determining the number of all of the additional subsets that do not erase verify.

14. The method of claim 11, further comprising:
in response to less than all of the subsets verifying as erased and prior to applying the second erase pulse, determining whether the second erase pulse would exceed a maximum number of erase pulses; and
in response to determining that the second erase pulse would exceed the maximum number of erase pulses, not applying the second erase pulse and returning an erase fail status.

15. A non-volatile memory system, comprising:
an array of non-volatile memory cells having a NAND architecture and comprising a plurality of blocks, each of the blocks comprising a plurality of sub-blocks;
means for applying a plurality of erase pulses to a selected block of the array;
means for sequentially erase verifying the sub-blocks, beginning with a first of the sub-blocks, of the selected block subsequent to applying each of the erase pulses thereto; and
means for determining a duration for the erase pulses by:
subsequent to applying a first erase pulse, erase verifying the first sub-block of the selected block and, in response to the first sub-block not passing the erase verifying, determining a number of memory cells of the first sub-block that have a threshold voltage above an erase verify level; and
based on the number of memory cells of the first sub-block that have the threshold voltage above the erase verify level, determining a duration for a subsequent, second erase pulse.

16. The non-volatile memory system of claim 15, wherein the means for determining the duration of the erase pulses further determines the duration of the erase pulses by:
in response to the first sub-block of the selected block passing the erase verify, erase verifying one or more additional sub-blocks of the selected block; and
in response to less than all of the additional sub-blocks of the selected block verifying as erased, determine a second duration based on a number of sub-blocks of the selected block that do not verify as erased.

17. The non-volatile memory system of claim 16, wherein the means for determining the duration of the erase pulses further determines the duration of the erase pulses by:
erase verifying a first of the additional sub-block of the selected block; and
in response to the first of the additional sub-block of the selected block, erase verifying a second sub-block of the selected block.

18. The non-volatile memory system of claim 16, wherein the means for determining the duration of the erase pulses further determines the duration of the erase pulses by erase verifying all of the additional sub-blocks of the selected block and determining the number of all of the additional sub-blocks of the selected block that do not erase verify.

19. The non-volatile memory system of claim 16, wherein the means for determining the duration of the erase pulses further determines the duration of the erase pulses by:
in response to less than all of the sub-blocks of the selected block verifying as erased and prior to applying the second erase pulse, determining whether the second erase pulse would exceed a maximum number of erase pulses; and
in response to determining that the second erase pulse would exceed the maximum number of erase pulses, not applying the second erase pulse and returning an erase fail status.

20. The non-volatile memory system of claim 15, wherein the array is on a first die and the means for applying a plurality of erase pulses to a selected block of the array, the means for sequentially erase verifying the sub-blocks of the selected block, and the means for determining a duration for the erase pulses are part of a control circuit formed on a second die, separate from and bonded to the first die.

* * * * *